US011649779B2

(12) United States Patent
Fukuchi

(10) Patent No.: US 11,649,779 B2
(45) Date of Patent: May 16, 2023

(54) CONTROL DEVICE

(71) Applicant: Hitachi Automotive Systems, Ltd., Hitachinaka (JP)

(72) Inventor: Eisaku Fukuchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 260 days.

(21) Appl. No.: 17/057,301

(22) PCT Filed: Jun. 17, 2019

(86) PCT No.: PCT/JP2019/023807
§ 371 (c)(1),
(2) Date: Nov. 20, 2020

(87) PCT Pub. No.: WO2020/008842
PCT Pub. Date: Jan. 9, 2020

(65) Prior Publication Data
US 2021/0189985 A1    Jun. 24, 2021

(30) Foreign Application Priority Data

Jul. 3, 2018    (JP) .............................. JP2018-127143

(51) Int. Cl.
*F02D 41/14* (2006.01)
*G07C 5/08* (2006.01)

(52) U.S. Cl.
CPC ....... *F02D 41/1495* (2013.01); *G07C 5/0808* (2013.01)

(58) Field of Classification Search
CPC .. F02D 41/1495; F02D 41/222; G07C 5/0808
See application file for complete search history.

(56) References Cited

U.S. PATENT DOCUMENTS 5,970,966 A * 10/1999 Sato ..................... F02D 41/1474
123/681
2005/0216175 A1    9/2005 Takahashi
(Continued)

FOREIGN PATENT DOCUMENTS

JP    2005-307961 A    11/2005
JP    2009-250086 A    10/2009
(Continued)

OTHER PUBLICATIONS

International Search Report with English translation and Written Opinion issued in corresponding application No. PCT/JP2019/023807 dated Oct. 15, 2019.

*Primary Examiner* — John Kwon
*Assistant Examiner* — Arnold Castro
(74) *Attorney, Agent, or Firm* — Foley & Lardner LLP

(57) ABSTRACT

Provided is a technology of accurately classifying abnormality in response characteristics of an air-fuel ratio sensors into six deterioration modes. In order to solve the above problems, the present disclosure provides a control device including a microprocessor that detects a response delay of an air-fuel ratio sensor attached to an internal combustion engine, in which the microprocessor includes a target air-fuel ratio change unit configured to change a target air-fuel ratio between lean and rich, and a response delay detection unit configured to detect a respond delay of the air-fuel ratio sensor that occurs in a real air-fuel ratio sensor signal output from the air-fuel ratio sensor when the target air-fuel ratio is changed between the lean and the rich by the target air-fuel ratio change unit.

13 Claims, 30 Drawing Sheets

(56) References Cited

U.S. PATENT DOCUMENTS

| | | | |
|---|---|---|---|
| 2005/0252196 A1* | 11/2005 | Aliakbarzadeh | F02D 41/1495 60/285 |
| 2010/0050602 A1* | 3/2010 | Fujimoto | F02D 41/1474 60/299 |
| 2011/0077840 A1* | 3/2011 | Nishigaki | F02D 41/2454 701/104 |
| 2016/0363029 A1* | 12/2016 | Suzuki | F02D 41/1474 |
| 2017/0030282 A1* | 2/2017 | Miyamoto | F02D 41/1495 |
| 2021/0189985 A1* | 6/2021 | Fukuchi | G01N 27/409 |

FOREIGN PATENT DOCUMENTS

| | | |
|---|---|---|
| JP | 2010-25090 A | 2/2010 |
| JP | 2012-127356 A | 7/2012 |
| JP | 2017-180116 A | 10/2017 |

\* cited by examiner

OVERVIEW OF LAF SENSOR RESPONSE DIAGNOSIS

AIR-FUEL RATIO SENSOR 6 FAILURE MODE

RELATIONSHIP BETWEEN TIME CONSTANT INDEX AND
TIME CONSTANT OF TIME CONSTANT DETERIORATION DIAGNOSIS

FIG. 8

| PATTERN | | RESPONSE DELAY | DETERMINATION METHOD OF MODES 1, 2, AND 3 |
|---|---|---|---|
| ONE SIDE | LEAN → RICH | MODE 1 — P014D NEGATIVE BEHAVIOR; LEAN → RICH TIME CONSTANT DELAY | (1) DIFFERENTIAL VALUE; (2) POSITIVE COUNTER A OF AIR-FUEL RATIO SENSOR; (1)/(2) DIVISION — DETERMINE AS MODE 1 IF WITHIN RANGE |
| ONE SIDE | LEAN ← RICH | MODE 2 — P014C RICH → LEAN TIME CONSTANT DELAY | (1) DIFFERENTIAL VALUE; (2) NEGATIVE COUNTER A OF AIR-FUEL RATIO SENSOR; (1)/(2) DIVISION — DETERMINE AS MODE 2 IF WITHIN RANGE |
| BOTH SIDES | | MODE 3 — P014C and P014D RICH ⇌ LEAN TIME CONSTANT DELAY | (1) DIFFERENTIAL VALUE; (2) NEGATIVE COUNTER A OF AIR-FUEL RATIO SENSOR; (1)/(2) DIVISION — DETERMINE AS MODE 3 IF WITHIN RANGE |

FAILURE MODE 1 (LEAN → RICH)

FAILURE MODE 2 (RICH → LEAN)

FAILURE MODE 3 (RICH ⇔ LEAN)

CASE OF MODE 1

CASE OF MODE 2

CASE OF MODE 3

DIAGNOSIS PRINCIPLE OF WASTED TIME DIAGNOSIS

FIG. 17

| PATTERN | | WASTED TIME DELAY | DETERMINATION METHOD OF MODES 4, 5, AND 6 |
|---|---|---|---|
| ONE SIDE | LEAN ↓ RICH | P015B  MODE 4<br>SLOPE (3), SLOPE (1) LEAN<br>SLOPE (2) RICH COMMAND VALUE<br>LEAN → RICH WASTED TIME DELAY | (1) DIFFERENTIAL VALUE: ZERO COUNTER B OF AIR-FUEL RATIO SENSOR<br>(2) DIFFERENTIAL VALUE: POSITIVE COUNTER B OF AIR-FUEL RATIO SENSOR<br>(3) DIFFERENTIAL VALUE: NEGATIVE COUNTER B OF AIR-FUEL RATIO SENSOR<br>PARAMETER OF MODE (IN THIS CASE, BECOMES MODE 4) |
| ONE SIDE | LEAN ↑ RICH | P014A  MODE 5<br>RICH → LEAN WASTED TIME DELAY<br>COMMAND VALUE<br>SLOPE (3) LEAN<br>SLOPE (2) SLOPE (1) RICH | (1) DIFFERENTIAL VALUE: ZERO COUNTER B OF AIR-FUEL RATIO SENSOR<br>(3) DIFFERENTIAL VALUE: NEGATIVE COUNTER B OF AIR-FUEL RATIO SENSOR<br>(2) DIFFERENTIAL VALUE: POSITIVE COUNTER B OF AIR-FUEL RATIO SENSOR<br>PARAMETER OF MODE (IN THIS CASE, BECOMES MODE 5) |
| BOTH SIDES | | P015A and P015B  MODE 6<br>RICH ⇔ LEAN WASTED TIME DELAY<br>COMMAND VALUE<br>SLOPE (3) LEAN<br>SLOPE (2) SLOPE (1) RICH | (3) DIFFERENTIAL VALUE: NEGATIVE COUNTER B OF AIR-FUEL RATIO SENSOR<br>(2) DIFFERENTIAL VALUE: POSITIVE COUNTER B OF AIR-FUEL RATIO SENSOR<br>(1) DIFFERENTIAL VALUE: ZERO COUNTER B OF AIR-FUEL RATIO SENSOR<br>PARAMETER OF MODE (IN THIS CASE, BECOMES MODE 6) |

| DETERMINATION OF MODE 4 | DETERMINATION OF MODE 5 | DETERMINATION OF MODE 6 |
|---|---|---|
| M4 M5<br>① ○ ○  (1)−(2)>FIXED NUMBER<br>② ○ ○  (1)−(3)>FIXED NUMBER<br>③ ○ ○  (2)−(3)>FIXED NUMBER<br>④ × ○  (3)−(2)>FIXED NUMBER<br>DETERMINE AS MODE 4 WHEN ①&②&③ ARE ESTABLISHED.<br>PRIORITY: MODE 4 > MODE 5 > MODE 6<br>○: ESTABLISHMENT<br>×: NON-ESTABLISHMENT | M4 M5<br>① ○ ○  (1)−(2)>FIXED NUMBER<br>② ○ ○  (1)−(3)>FIXED NUMBER<br>③ × ×  (2)−(3)>FIXED NUMBER<br>④ × ○  (3)−(2)>FIXED NUMBER<br>DETERMINE AS MODE 5 WHEN ①&②&④ ARE ESTABLISHED.<br>M4: MODE 4<br>M5: MODE 5 | WHEN OTHER THAN DESCRIPTION ON LEFT, IT IS DETERMINED AS MODE 6.<br>*DETERMINATION PRINCIPLE IS THAT AIR-FUEL RATIO SENSOR OPERATES ACCORDING TO COMMAND VALUE, BUT SINCE SLOPES (2) AND (3) ALSO HAVE NORMAL PART, AND SLOPE (1) HAS UPPER AND LOWER PART, COUNTER ESTABLISHED AS DESCRIBED ON LEFT OPERATES, AND MODE IS DETERMINED BY COMBINATION OF EQUATIONS ON LEFT. |

FAILURE MODE 4 (LEAN → RICH)

FAILURE MODE 5 (RICH → LEAN)

FAILURE MODE 6 (RICH ⇔ LEAN)

CASE OF MODE 4

CASE OF MODE 5

CASE OF MODE 6

*: LEAN VALUE > RICH VALUE

CONTROL DEVICE

TECHNICAL FIELD

The present disclosure relates to a control device, for example, a technique for complying with on-board self-diagnosis regulations of automobiles.

BACKGROUND ART

As a device for reducing harmful exhaust gas from automobiles and improving fuel efficiency and drivability, a feedback type air-fuel ratio control device that controls an air-fuel ratio based on information on exhaust gas components of an internal combustion engine such as an engine has been put into practical use.

In the air-fuel ratio control device, the abnormality in the exhaust gas component or the abnormality in the control system may not be properly controlled due to the failure or deterioration of a used air-fuel ratio sensor itself. In particular, the air-fuel ratio sensor is installed immediately after the engine exhaust, and thus is susceptible to high temperature, high pressure, vibration, inferior fuel, and the like, so the air-fuel ratio sensor tends to deteriorate.

In particular, automobiles destined for North America needs to comply with OBDII regulations (law mandating an installation of on-board self-diagnostic equipment), and when the air-fuel ratio sensor experiences a failure exceeding 1.5 times an exhaust gas regulation value, it is necessary to immediately alert an operator of the abnormality in the air-fuel ratio sensor and urge the operator to repair the air-fuel ratio sensor. Therefore, when the detection accuracy of the air-fuel ratio sensor deteriorates for some reason, it is necessary to take appropriate measures such as replacing the sensor.

Response characteristics of the air-fuel ratio sensor need to be maintained in a normal state in order to control the real air-fuel ratio well at a three-way point of a three-way catalyst by air-fuel ratio feedback control, and detecting response abnormality is an essential technique in the OBDII regulations.

Therefore, in order to diagnose the response characteristics of the air-fuel ratio sensor, it is mandated to detect six deterioration modes in the OBDII regulations. Measures for detecting these six deterioration modes are required.

CITATION LIST

Patent Literature

PTL 1: JP 2012-127356 A

SUMMARY OF INVENTION

Technical Problem

There are six deterioration modes in the abnormality in the response characteristics of the air-fuel ratio sensor. These six deterioration modes are a regulatory requirement for the OBDII regulations and are necessarily detected. These six deterioration modes are as follows.

According to the OBDII, it is required to accurately detect (i) lean→rich response time abnormality (mode 1), (ii) rich→lean response time abnormality (mode 2), (iii) lean⇔rich response time abnormality (mode 3), (iv) lean→rich wasted time abnormality (mode 4), (v) rich→lean wasted time abnormality (mode 5), and (vi) lean⇔rich wasted time abnormality (mode 6).

The present disclosure has been made in view of such a situation, and provides a technique for accurately classifying abnormalities in response characteristics of an air-fuel ratio sensor.

Solution to Problem

In order to solve the above problems, the present disclosure provides a control device including a microprocessor that detects a response delay of an air-fuel ratio sensor attached to an internal combustion engine, in which the microprocessor includes a target air-fuel ratio change unit configured to change a target air-fuel ratio between lean and rich, and a response delay detection unit configured to detect a respond delay of the air-fuel ratio sensor that occurs in a real air-fuel ratio sensor signal output from the air-fuel ratio sensor when the target air-fuel ratio is changed between the lean and the rich by the target air-fuel ratio change unit.

Further features related to the present disclosure will become apparent from the description herein and the accompanying drawings. In addition, the aspects of the present disclosure are achieved and realized by the combination of elements and various elements, the detailed description below, and the aspects of the appended claims.

It should be understood that the description herein is merely an exemplary example and is not intended to limit the claims or application examples of the present disclosure in any way.

Advantageous Effects of Invention

According to the present disclosure, it is possible to accurately classify the abnormality in the response characteristics of the air-fuel ratio sensor into the six deterioration modes.

BRIEF DESCRIPTION OF DRAWINGS

FIG. 8 is a diagram for describing a method of determining failure modes 1 to 3.

FIG. 17 is a diagram for describing a method of determining failure modes 4 to 6 (wasted time deterioration) of the air-fuel ratio sensor 205.

DESCRIPTION OF EMBODIMENTS

Hereinafter, a diagnostic device (may be referred to as a control device) of an air-fuel ratio sensor according to the present disclosure will be described in detail based on the embodiment.

<Configuration Example of Air-Fuel Ratio Sensor Diagnosis Device>

Figure 1:
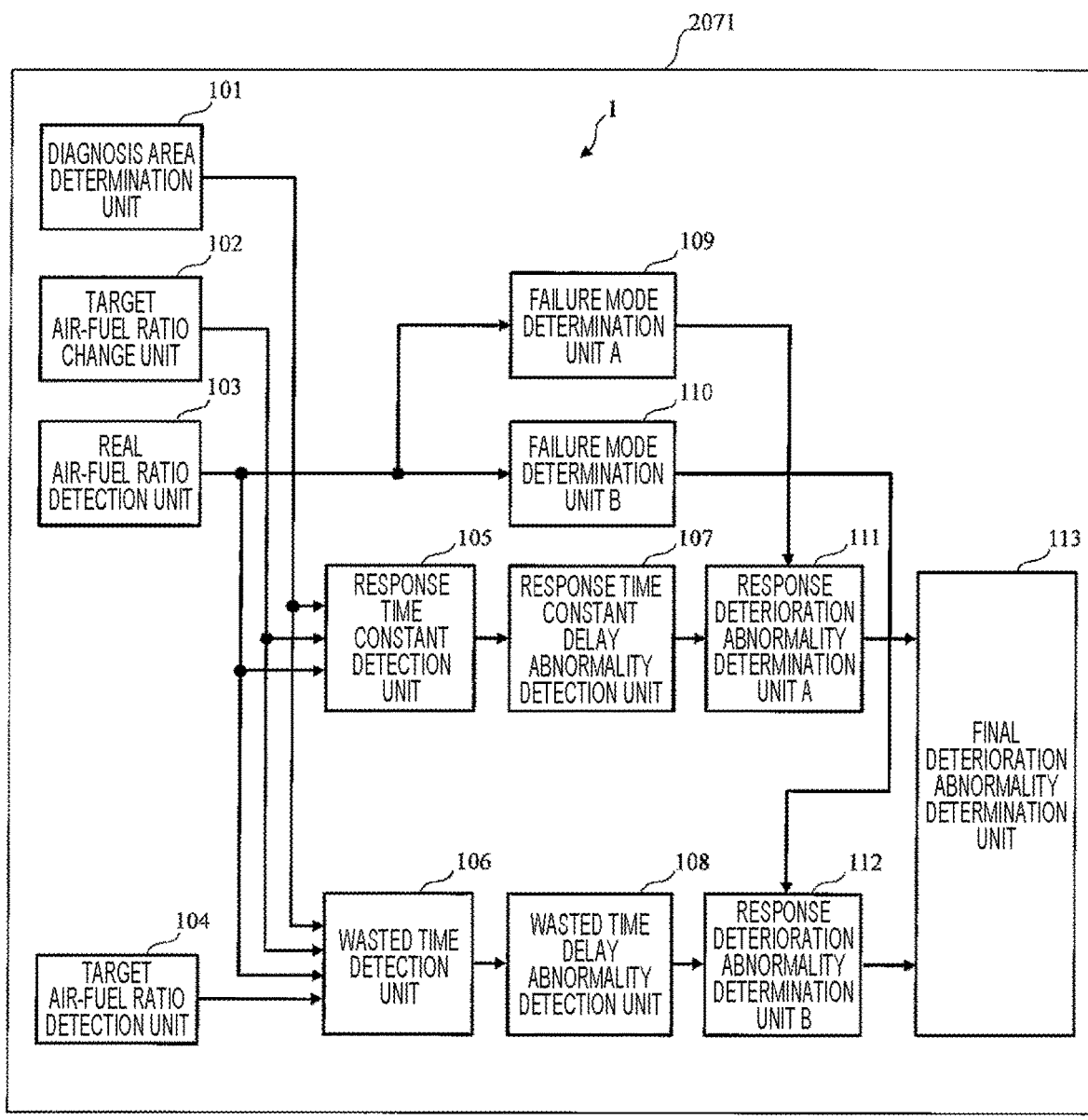
FIG. 1 is a block diagram illustrating a schematic configuration example of an air-fuel ratio sensor diagnosis device 1 according to the present embodiment.

FIG. 1 is a block diagram illustrating a schematic configuration example of an air-fuel ratio sensor diagnosis device 1 according to the present embodiment. The air-fuel ratio sensor diagnosis device 1 is realized by the MPU2071 of the internal combustion engine control device 207 (see FIG. 2). That is, the MPU2071 (see FIG. 2) includes functions of each processing unit (for example, realized by a program) of the air-fuel ratio sensor diagnosis device illustrated in FIG. 1. The air-fuel ratio sensor diagnosis device 1 includes a diagnosis area determination unit 101 configured to determine whether or not a diagnosis area (diagnosis condition: whether a condition for performing a diagnosis of an air-fuel ratio sensor 205 is satisfied) is reached, a target air-fuel ratio change unit 102 configured to swing a target air-fuel ratio (oxygen concentration of targeted gas) to be rich or lean, a real air-fuel ratio detection unit 103 configured to detect a real air-fuel ratio, a target air-fuel ratio detection unit 104 configured to detect a target air-fuel ratio, a response time constant detection unit 105 configured to detect a rich→lean response time constant, a rich→lean response time constant, and a lean⇔rich response time constant, a wasted time detection unit 106 configured to detect wasted time 1, wasted time 2, and wasted time 1+wasted time 2, a response time constant delay abnormality detection unit 107 configured to determine to be abnormal when a lean→rich response time constant delay, a rich→lean response time constant delay, and a lean⇔rich response time constant delay each exceeds a threshold value, a wasted time delay abnormality detection unit 108 configured to determine to be abnormal when the wasted time 1, the wasted time 2, and the wasted time 1+wasted time 2 each exceed the threshold value, a failure mode determination unit A109 configured to determine failure mode 1, failure mode 2, and failure mode 3 (see FIG. 4), a failure mode determination unit B110 configured to determine failure mode 4, failure mode 5, and failure mode 6 (see FIG. 4), a response deterioration abnormality determination unit A111 configured to determine a type of response delay abnormality based on a detection result by the response time constant delay abnormality detection unit 107 and a determination result of the failure mode determination unit A109, a response deterioration abnormality determination unit B112 configured to determine a type of wasted time delay abnormality based on a result by the wasted time delay abnormality detection unit 108 and a determination result of the failure mode determination unit B110, and a final deterioration abnormality determination unit 113 configured to determine a final failure mode (determine which of the six failure modes abnormality detected by the response time constant delay abnormality detection unit 107 or abnormality detected by wasted time delay abnormality detection unit 108 is).

Note that each processing unit 101 to 113 is realized by a program, for example.

In the actual operation, the MPU2071 reads a program from a memory (for example, ROM of the internal combustion engine control device 207), develops the read program to an internal memory of the MPU2071 (not illustrated), and generates each processing unit 101 to 113.

<Configuration Example of Internal Combustion Engine System>

Figure 2:
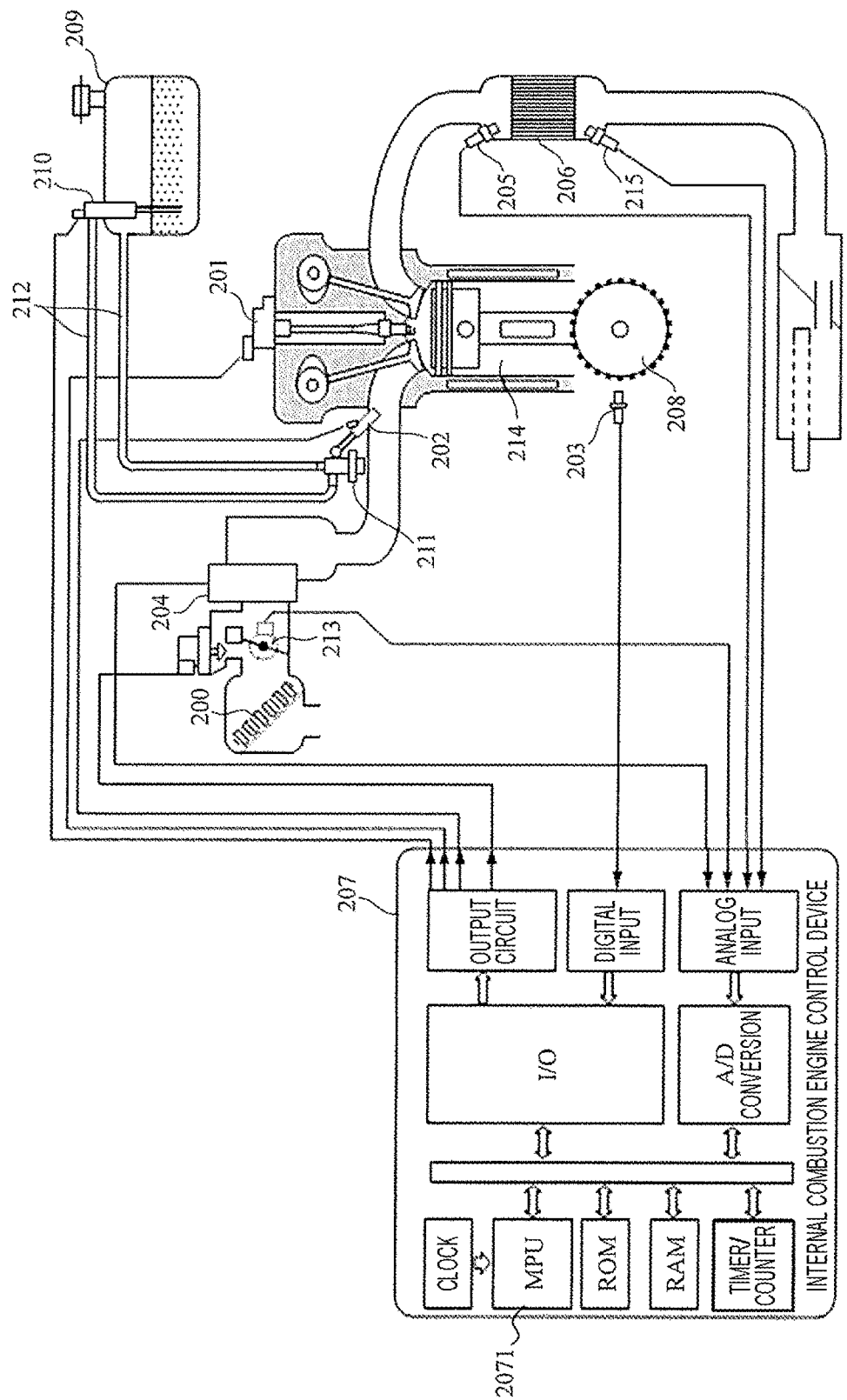
FIG. 2 is a diagram illustrating a configuration example of an internal combustion engine system which is a diagnosis target in the present embodiment.

FIG. 2 is a diagram illustrating a configuration example of an internal combustion engine system which is a diagnosis target in the present embodiment. The internal combustion engine system includes an internal combustion engine, an intake system, and an exhaust system. The internal combustion engine includes an ignition device 201, a fuel injection device 202, and a number of revolution detection device 203. A flow rate of air inflowing from the air cleaner 200 is regulated by a throttle valve 213 and then measured by a flow rate detection device 204, and the air is mixed with fuel injected from the fuel injection device 202 at a predetermined angle and supplied to each cylinder 214. In addition, the exhaust system includes an air-fuel ratio sensor 205 and a three-way catalyst 206. Exhaust gas is purified by the three-way catalyst 206 and then discharged to the atmosphere.

The internal combustion engine control device 207 takes in an output signal Qa from the flow rate detection device 204 and the number of revolutions Ne of the ring gear or the plate 208 by the number of revolution detection device 203 to calculate a fuel injection amount Ti and control an injection amount of the fuel injection device.

In addition, the internal combustion engine control device 207 acquires an air-fuel ratio in the internal combustion engine detected by the air-fuel ratio sensor 205, and performs air-fuel ratio feedback control to correct the fuel injection amount Ti so that the air-fuel ratio in the internal combustion engine becomes a theoretical air-fuel ratio. In addition, the air-fuel ratio after the catalyst is detected by an oxygen sensor 215.

On the other hand, the fuel in the fuel tank 209 is sucked and pressurized by the fuel pump 210 and then guided to a fuel inlet of the fuel injection device 202 through a fuel pipe 212 equipped with a pressure regulator 211, and an extra fuel returns to a fuel tank 209.

This is an overview of the operation of the targeted internal combustion engine system.

<Operation of Air-Fuel Ratio Sensor Response Detection Diagnosis>

(i) Existing air-fuel ratio sensor response deterioration determination

Figures 3, 4:
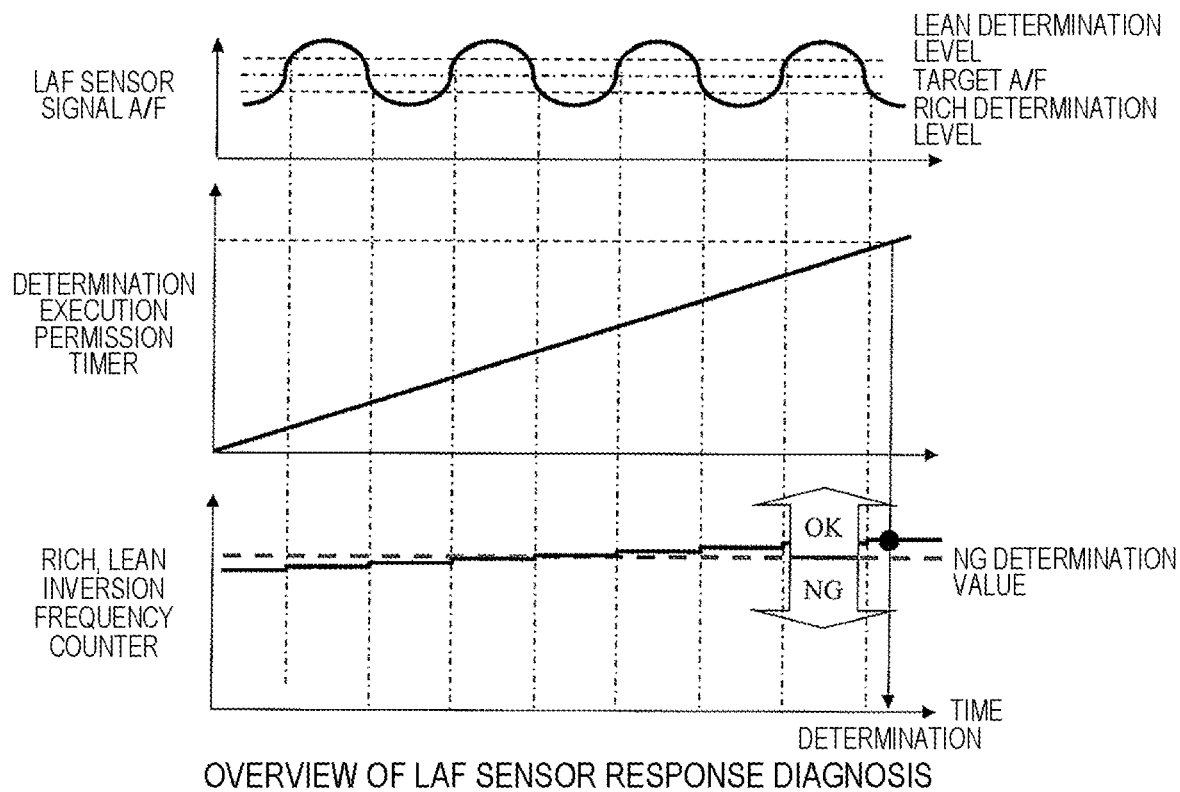
FIG. 3 is a diagram illustrating an operation of the existing air-fuel ratio sensor response deterioration diagnosis.
FIG. 4 is a diagram illustrating failure modes 1 to 6.

FIG. 3 is a diagram illustrating an operation of the existing air-fuel ratio sensor response deterioration diagnosis. The air-fuel ratio sensor response deterioration diagnosis measures a time after a diagnosis area (called a diagnosis condition, the same applies below) is established, and measures a rich lean inversion frequency during the period. When a predetermined determination time elapses after the diagnosis area is established, if a counter value of the rich lean inversion frequency is equal to or greater than a predetermined threshold value, it is determined to be normal, and if the counter value is less than the predetermined threshold value, it is determined to be abnormal. In the case of FIG. 3, the normal operation is illustrated.

However, the existing method cannot determine (distinguish) the deterioration in the six failure modes illustrated in FIG. 4 as OBDII regulation compliance. Therefore, the embodiment of the present disclosure provides a technique for determining the deterioration in the six failure modes illustrated in FIG. 4 and determining abnormality.

(ii) Failure Modes 1 to 6

FIG. 4 is a diagram illustrating failure modes 1 to 6. The failure mode 1 is a case where a command value swings between lean and rich, and there is a delay (equal to or greater than a predetermined threshold) of a response time constant when shifting from lean to rich. The failure mode 2 is a case where a command value swings between lean and rich, and there is the delay (equal to or greater than a predetermined threshold) of the response time constant when shifting from rich to lean. The failure mode 3 is a case where the command value swings between the lean and the rich, and there is the delay (equal to or greater than a predetermined threshold) of the response time constant in both when shifting from lean to rich and when shifting from rich to lean.

The wasted time delay includes two types of wasted time, the wasted time 1 and the wasted time 2. The wasted time 1 indicates a time difference from the time when the target air-fuel ratio rises to the lean to the time when the real air-fuel ratio sensor signal rises to the lean at the target air-fuel ratio and the real air-fuel ratio when the command value swings between the lean and the rich. The wasted time 2 indicates the time difference from the time when the target air-fuel ratio falls to the rich to the time when the real air-fuel ratio sensor signal falls to the rich. The failure mode 3 is a case where there is the wasted time 1 (equal to or greater than a predetermined threshold). The failure mode 4 is a case where there is the wasted time 2 (equal to or greater than a predetermined threshold). The failure mode 6 is a case where there are both (equal to or greater than a predetermined threshold) of the wasted time 1 and the wasted time 2.

(iii) Method of Detecting Response Time Delay Failure Modes 1 to 3 Illustrated in FIG. 4

Figure 5:
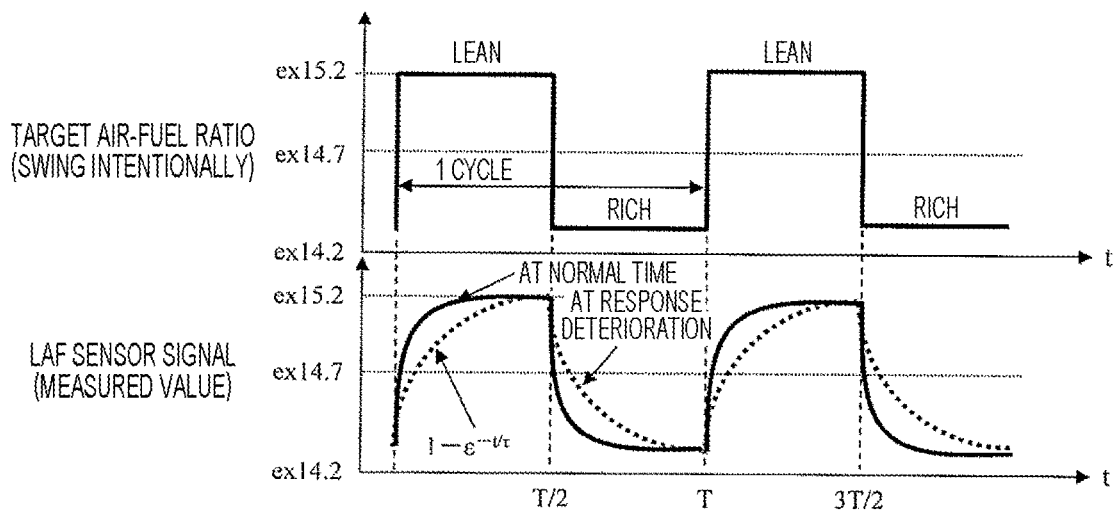
FIG. 5 is a diagram illustrating a principle (principle of time constant deterioration diagnosis) of detecting a response time delay failure mode.

FIG. 5 is a diagram illustrating a principle of detecting the response time delay failure mode (principle of time constant deterioration diagnosis).

The target air-fuel ratio swings from rich to lean and from lean to rich at predetermined time intervals. At that time, the temporary time constant index (temporary response deterioration index) can be expressed as in Equation (1). Note that 1/T is an index used for the response deterioration diagnosis by an O2 sensor.

The principle is based on the idea that if $1/\tau$ is obtained, a reciprocal thereof is taken when the response time delay failure mode is detected, and the time constant $\tau$ itself is obtained.

[Equation 1]

$$\text{Temporary time constant index} = \int_0^{T/2} \left[\frac{d}{dt}(1-\varepsilon^{-t/\tau})\right]^2 dt \quad (1)$$

$$= \frac{1}{2\tau}(1-\varepsilon^{-T/\tau})$$

$$\beta = \frac{d}{dt}(1-\varepsilon^{-t/\tau}) = dLAF/dt$$

In Equation (1), in order for $T > \tau$ to be established, Equation (2) needs to be established.

[Equation 2]

$$\text{Temporary response deterioration index} = \frac{1}{2\tau} \propto \frac{1}{\tau} \quad (2)$$

Therefore, it can be seen from Equation (2) that the temporary time constant index is a parameter that is inversely proportional to the response time constant. Therefore, by taking the reciprocal of Equation (2), a time constant index proportional to the time constant τ can be obtained (see Equation (3)).

[Equation 3]

$$\text{Response deterioration index} \propto \frac{1(\text{Coefficient})}{\text{Temporary response deterioration index}} \quad (3)$$

<Relationship Between Time Constant Index and Time Constant of Time Constant Deterioration Diagnosis>

Figure 6:
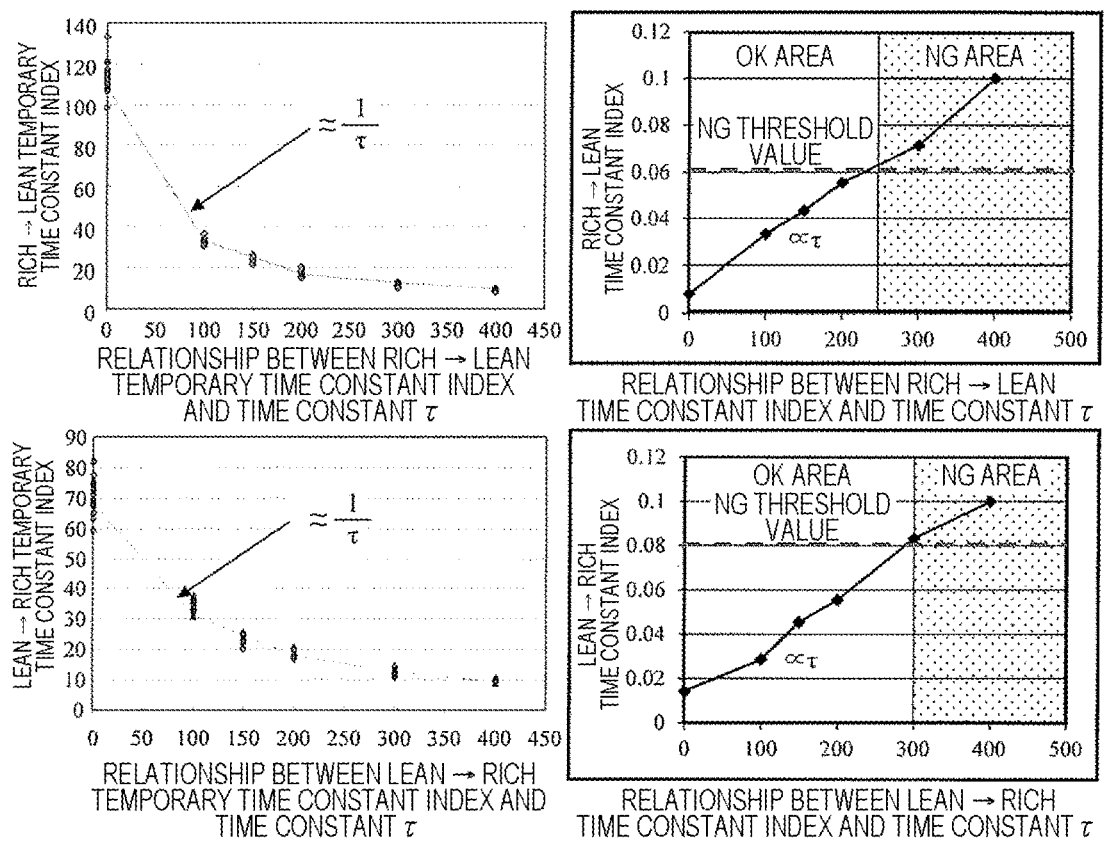
FIG. 6 is a diagram illustrating a relationship between a temporary time constant index and a time constant index when a response deterioration of the air-fuel ratio sensor signal actually occurs.

FIG. 6 is a diagram illustrating the relationship between the temporary time constant index and the time constant index when the response of the air-fuel ratio sensor signal actually deteriorates. It can be seen from the left in FIG. 6 that the temporary time constant index is inversely proportional to the time constant. From this, if the reciprocal is taken, the time constant index proportional to the time constant can be calculated (see the right in FIG. 6).

Then, when the rich→lean time constant index becomes greater than a predetermined NG threshold value, it is determined that the rich→lean response time constant abnormality has occurred. In addition, when the lean⇔rich time constant index becomes greater than the predetermined NG threshold value, it is determined that the lean→rich response time constant abnormality has occurred.

<Relationship Between Time Constant and Time Constant Index of Air-Fuel Ratio Sensor>

Figure 7:
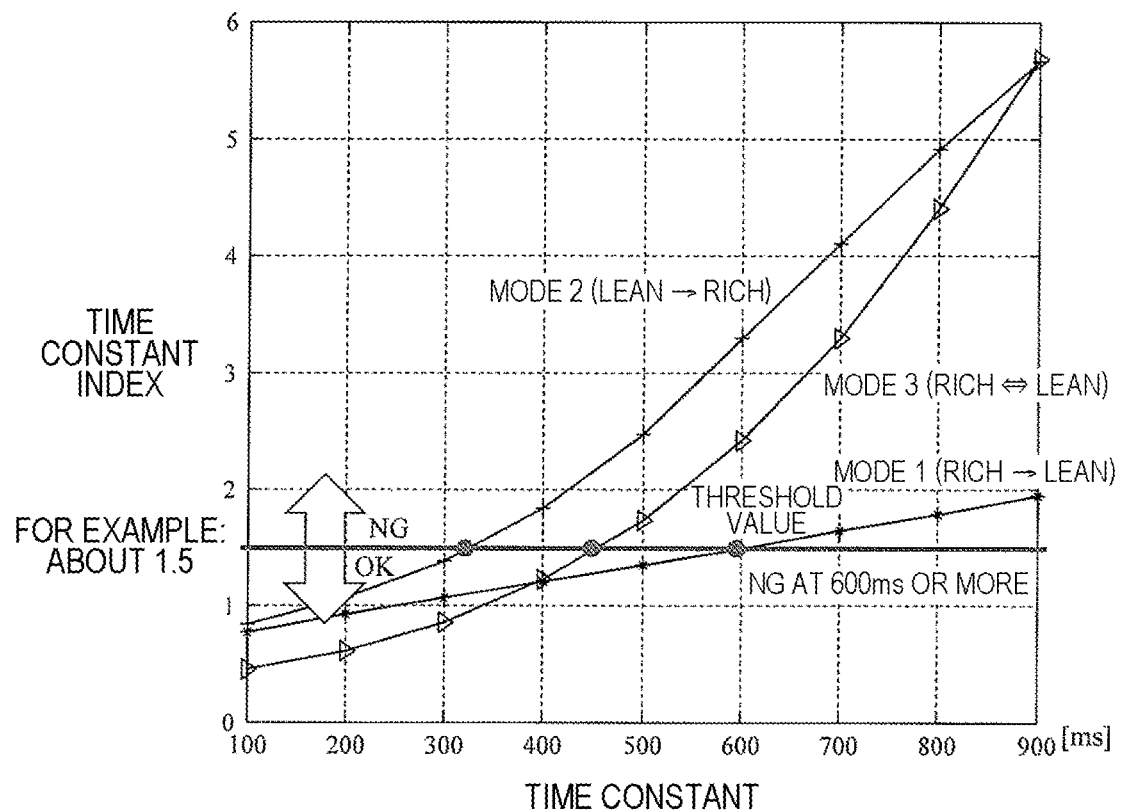
FIG. 7 is a diagram illustrating a relationship between a time constant and a time constant index of an air-fuel ratio sensor 205 of failure modes 1 to 3.

FIG. 7 is a diagram illustrating the relationship between the time constant and the time constant index of the air-fuel ratio sensor 205 of the failure modes 1 to 3. FIG. 7 illustrates the relationship between the time constant index and the time constant (right in FIG. 6) of the time constant deterioration diagnosis of the failure modes 1 to 3 as one graph.

As illustrated in FIG. 7, curves of the failure modes 1 to 3 overlap on the graph.

Therefore, for example, when the threshold value is set to 1.5, all of the failure modes 1 to 3 are determined as NG, and any failure mode is not determined. Therefore, it can be seen that it is necessary to determine each failure mode. In other words, the failure modes cannot be detected (diagnosed) accurately unless the NG threshold value is set for each mode.

<As to Determination of Failure Modes 1 to 3 in Air-Fuel Ratio Sensor>

FIG. 8 is a diagram for describing a method of determining failure modes 1 to 3. The method corresponds to a process in a failure mode determination unit A109.

The present embodiment employs a method of determining a failure mode from positive and negative ratios of differential values of the air-fuel ratio sensor 205, and employs a counter (not shown: included in the failure mode determination unit A109) for convenience of logic. If the differential value of the air-fuel ratio sensor 205 is "negative", the counter A with a "negative" slope is incremented (by +1), and the counter A with a "positive" slope is retained. On the other hand, if the differential value of the air-fuel ratio sensor 205 is "positive", the counter A with a "positive" slope is incremented (by +1), and the counter A with a "negative" slope is retained.

However, the actual air-fuel ratio sensor value has fine noise, and even if the differential value of the air-fuel ratio sensor 205 is "positive", the counter A with the "negative" slope is slightly incremented. Similarly, even if the differential value of the air-fuel ratio sensor 205 is "negative", the counter A with the "positive" slope is slightly incremented. In particular, when a degree of dulling of the real air-fuel ratio sensor signal worsens during operation, noise is also blurred, and a difference occurs in the counter A with the "negative/positive" slopes. This can be seen from the operation of the counter A with the "positive/negative" slopes in FIG. 8. That is, the counter A with the "negative" slope is a parameter representing the "negative" slope, and the counter A with the "positive" slope is a parameter representing the "positive" slope.

As a result of intensive research on such a phenomenon, the inventor has found that it is possible to detect the difference in the slope when the real air-fuel ratio sensor signal changes from lean to rich and from rich to lean by taking the ratio of the counter A with the "negative" slope and the counter A with the "positive" slope. Specifically, the ratio represents a ratio of the slope when changing from lean to rich and the slope when changing from rich to lean, and from the value, the degree of dulling of the real air-fuel ratio sensor signal can be detected during operation. That is, when the ratio is very large (for example: 10 or more), it can be determined to be the failure mode 1 (the negative side of the slope is dull), when the ratio is very small (for example: near zero), it can be determined to be the failure mode 2 (the positive side of the slope is dull), and in other cases, it can be determined to be failure mode 3 (both the positive and negative sides of the slope are dull).

Note that the determination process based on the final ratio can be performed when the number of times the real air-fuel ratio sensor signal swings reaches N (diagnosis ends).

Figure 9:
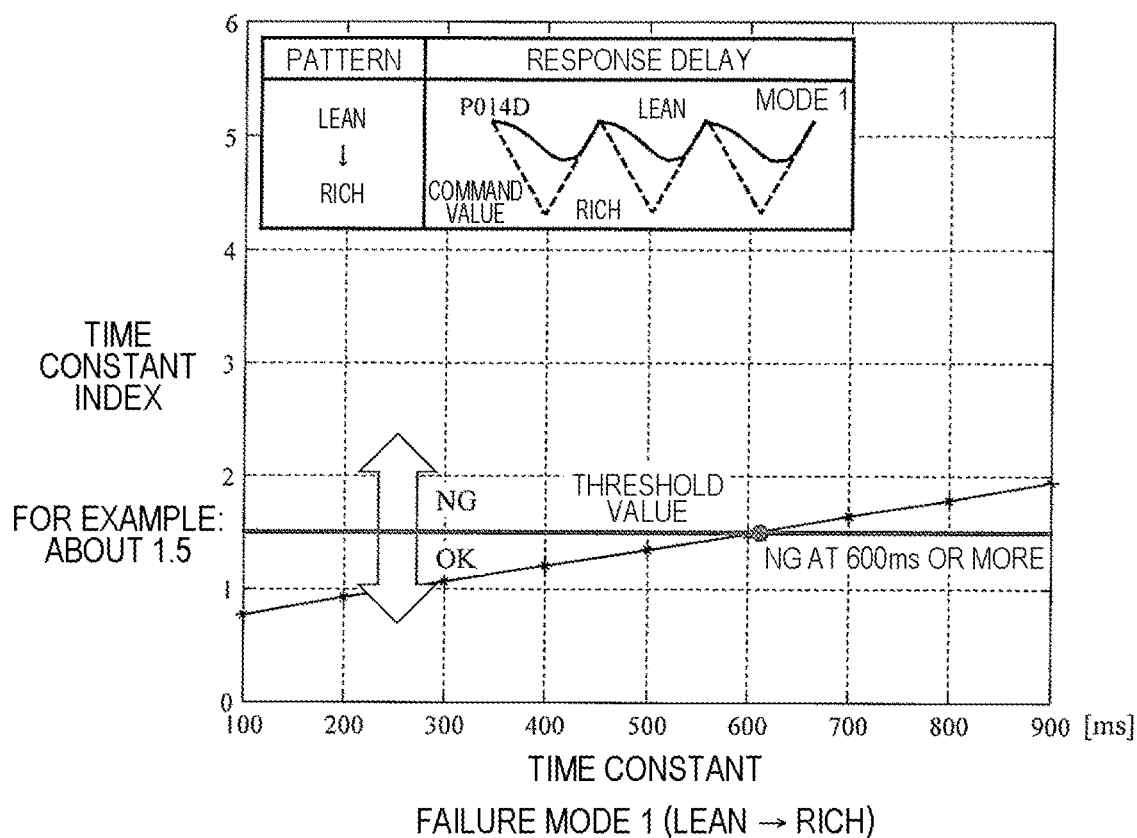
FIG. 9 is a diagram illustrating the relationship between the time constant index and the time constant at the time of the failure mode 1.
Figure 10:
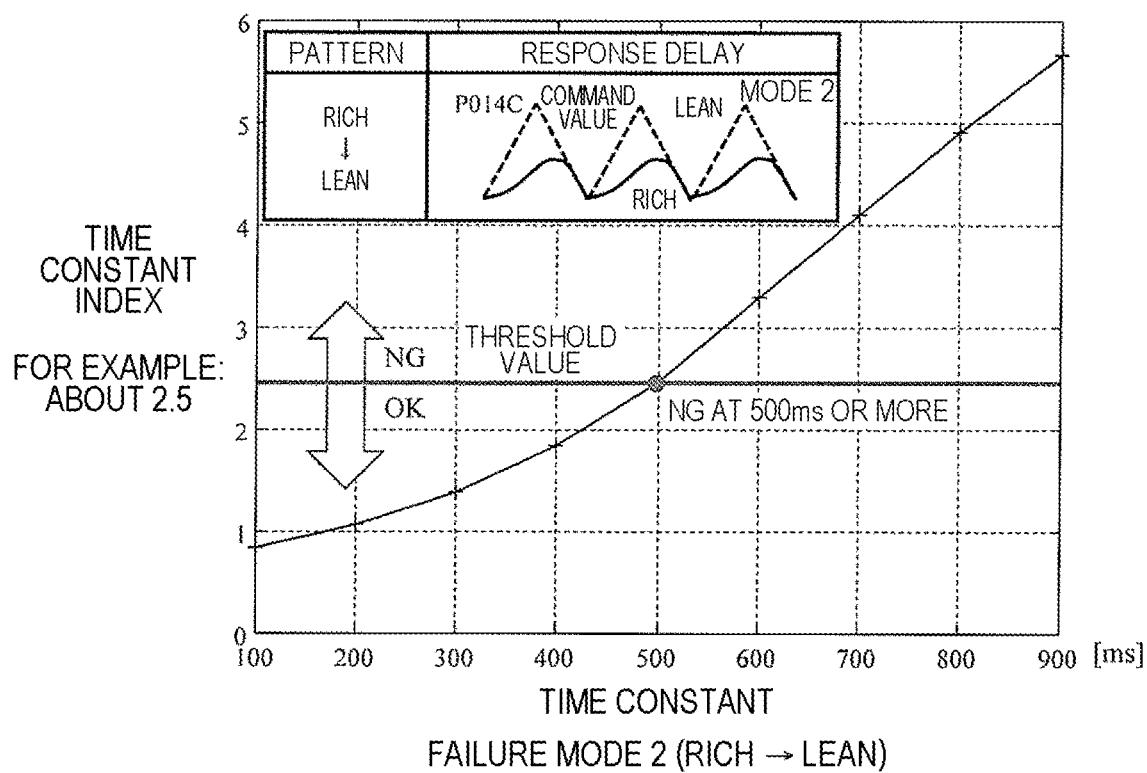
FIG. 10 is a diagram illustrating the relationship between the time constant index and the time constant at the time of the failure mode 2.
Figure 11:
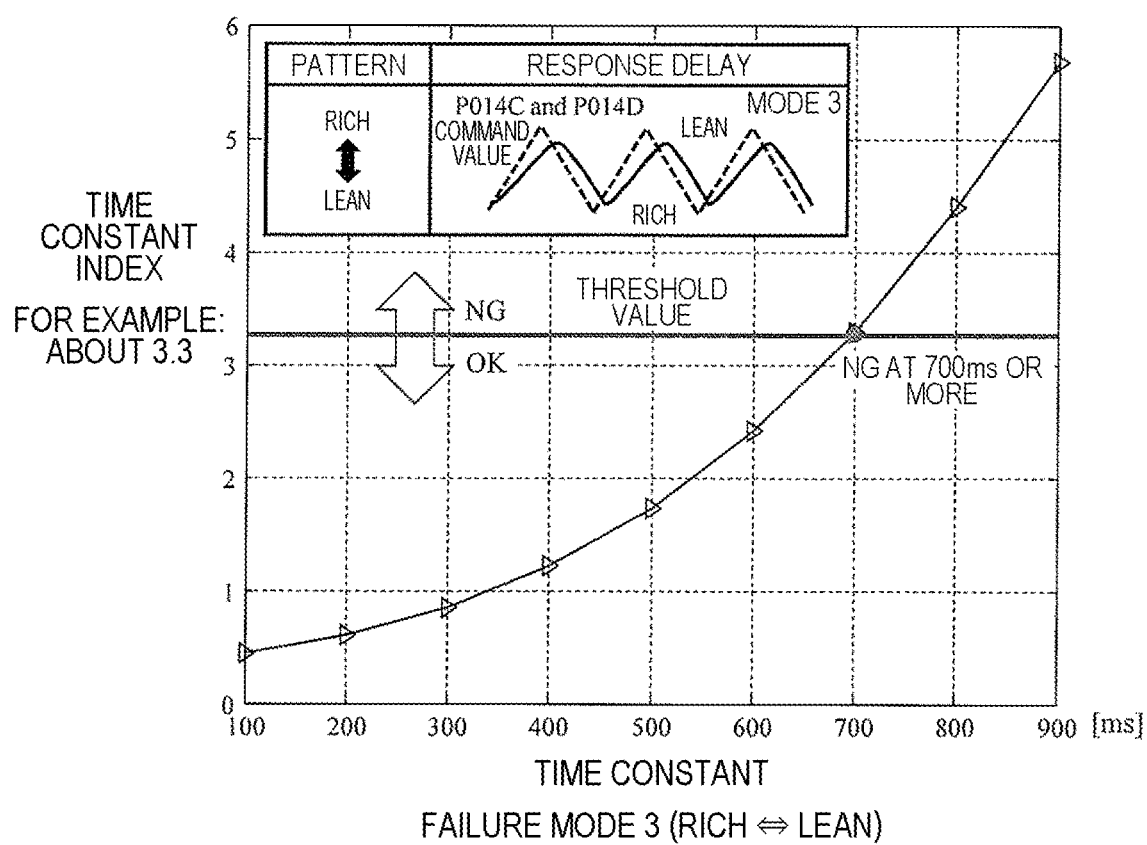
FIG. 11 is a diagram illustrating the relationship between the time constant index and the time constant at the time of the failure mode 3.

As a result, it is possible to determine the failure modes 1 to 3. Therefore, when the failure modes are illustrated in the drawings once again, these failure modes are as illustrated in FIGS. 9, 10, and 11. Unlike FIG. 7, the threshold value based on the OBD regulation can be set for each failure mode. Therefore, if it is greater than the threshold value, it can be determined to be abnormal. As an example, in FIG. 9, when the time constant index is greater than 1.5 (t=600 ms), it is determined that the failure mode 1 is abnormal, in FIG. 10, when the time constant index is greater than 2.5 (t=500 ms), it is determined that the failure mode 2 is abnormal, and in FIG. 11, when the time constant index is greater than 3.3 (t=700 ms), it can be determined that the failure mode 3 is abnormal.

Figure 12:
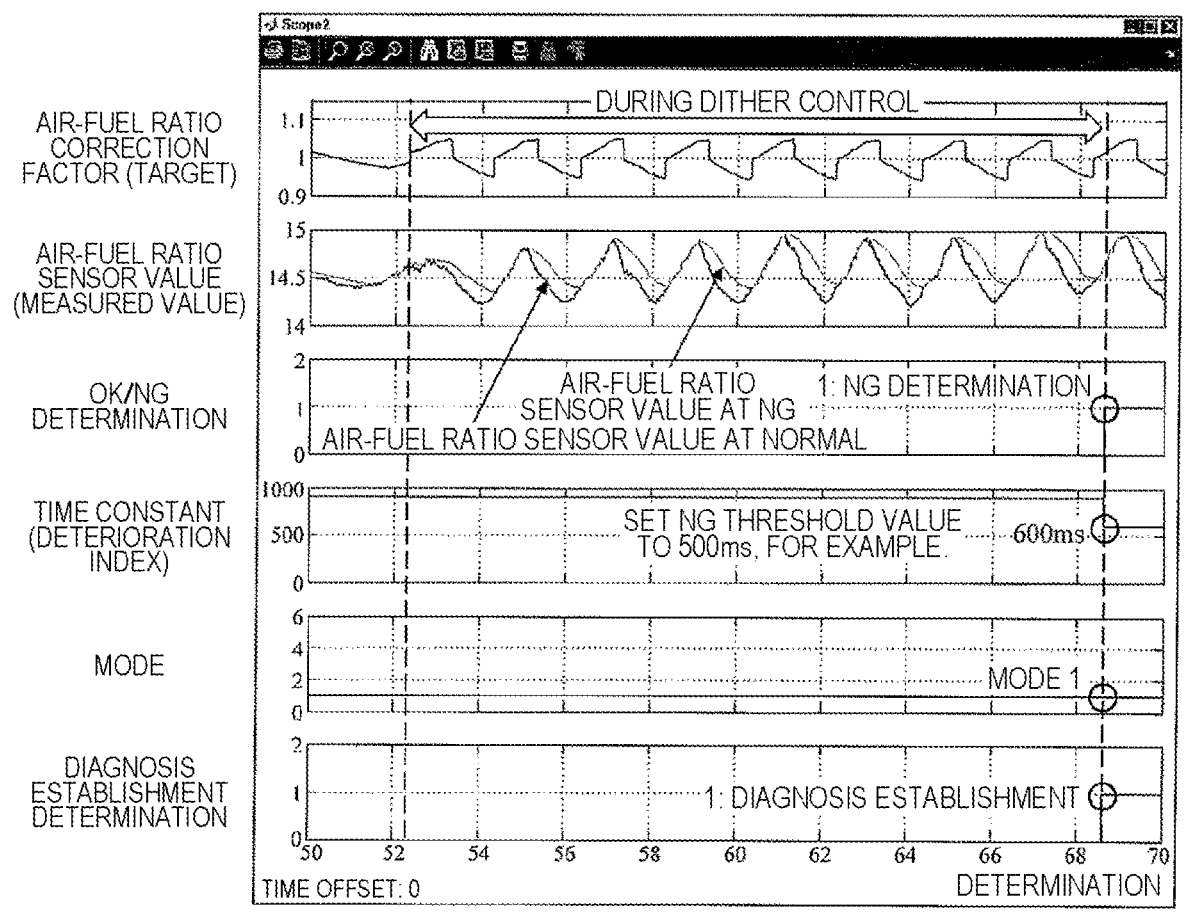
FIG. 12 is a diagram illustrating a determination result at the time of the failure mode 1.
Figure 13:
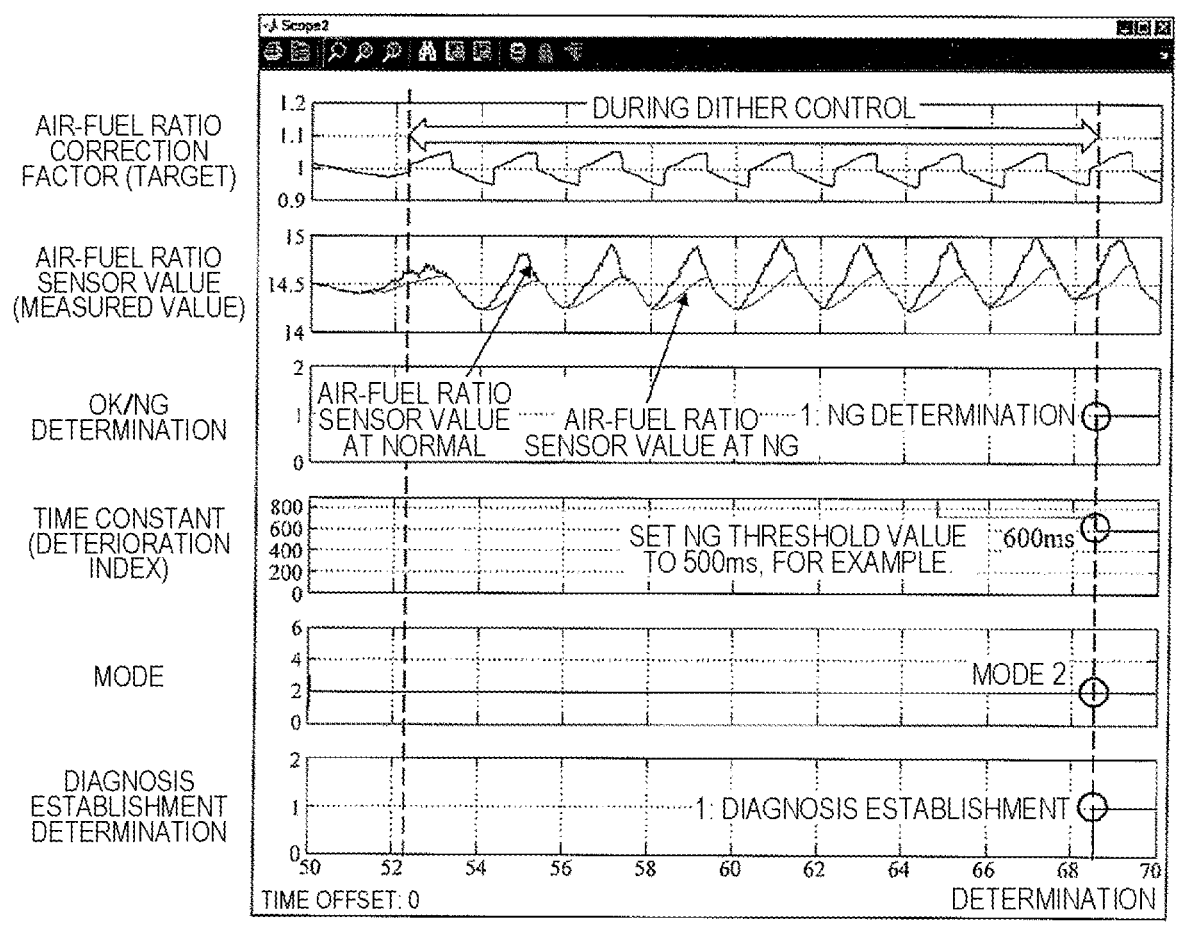
FIG. 13 is a diagram illustrating a determination result at the time of the failure mode 2.
Figure 14:
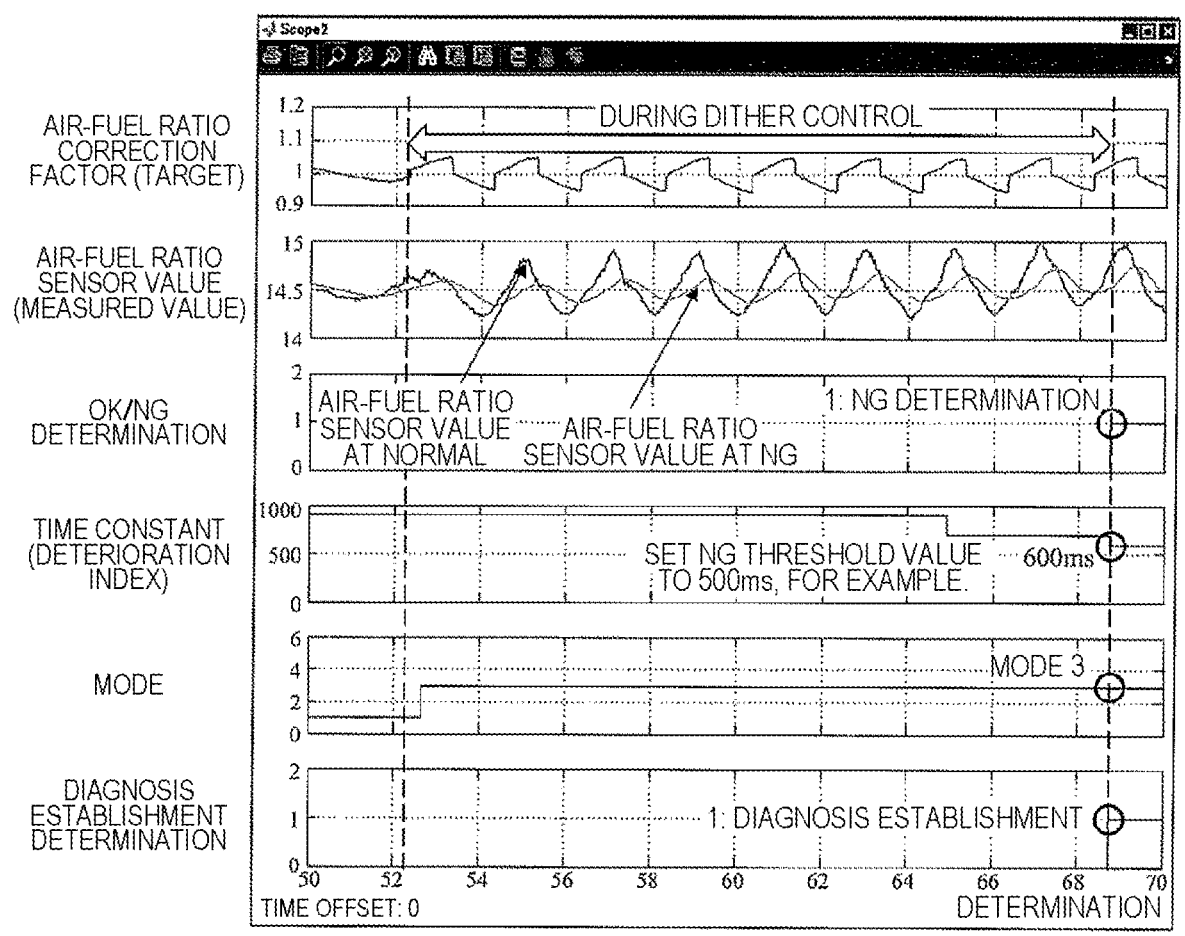
FIG. 14 is a diagram illustrating a determination result at the time of the failure mode 3.

Therefore, although it is a desk simulation, the actual air-fuel ratio sensor signal deteriorates to verify detection performance. FIGS. 12, 13, and 14 each are diagrams illustrating the determination results of the failure modes 1 to 3. Here, for example, the target air-fuel ratio change unit 102 swings an air-fuel ratio correction coefficient larger than the normal control (dither control), and verifies the detection (diagnosis) performance (whether it can be actually detected (diagnosed)) of the mode determination and the abnormality determination from the behavior of the real air-fuel ratio sensor signal by the above-described method.

In FIG. 12, in the case of the failure mode 1, the NG threshold value is set to be 500 ms, and the lean→rich time constant delay is set to be 600 ms. From FIG. 12, it can be seen that since the failure mode is determined to be "1" and the time constant delay is greater than the NG threshold value (500 ms), it is determined to be NG.

In FIG. 13, in the case of the failure mode 2, the NG threshold value is set to be 500 ms, and the rich→lean time constant delay is similarly set to be 600 ms. From FIG. 13, it can be seen that since the failure mode is determined to be "2" and the time constant delay is greater than the NG threshold value (500 ms), it is determined to be NG.

In FIG. 14, in the case of the failure mode 3, the NG threshold value is set to be 500 ms, and the lean→rich time constant delay is similarly set to be 600 ms. From FIG. 14, it can be seen that since the failure mode is determined to be "3" and the time constant delay is greater than the NG threshold value (500 ms), it is determined to be NG.

The above is an example of the detection (diagnosis) method of the failure modes 1 to 3. Next, the detection (diagnosis) method of the failure modes 4 to 6 will be described.

<Principle of Wasted Time Diagnosis>

Figure 15:
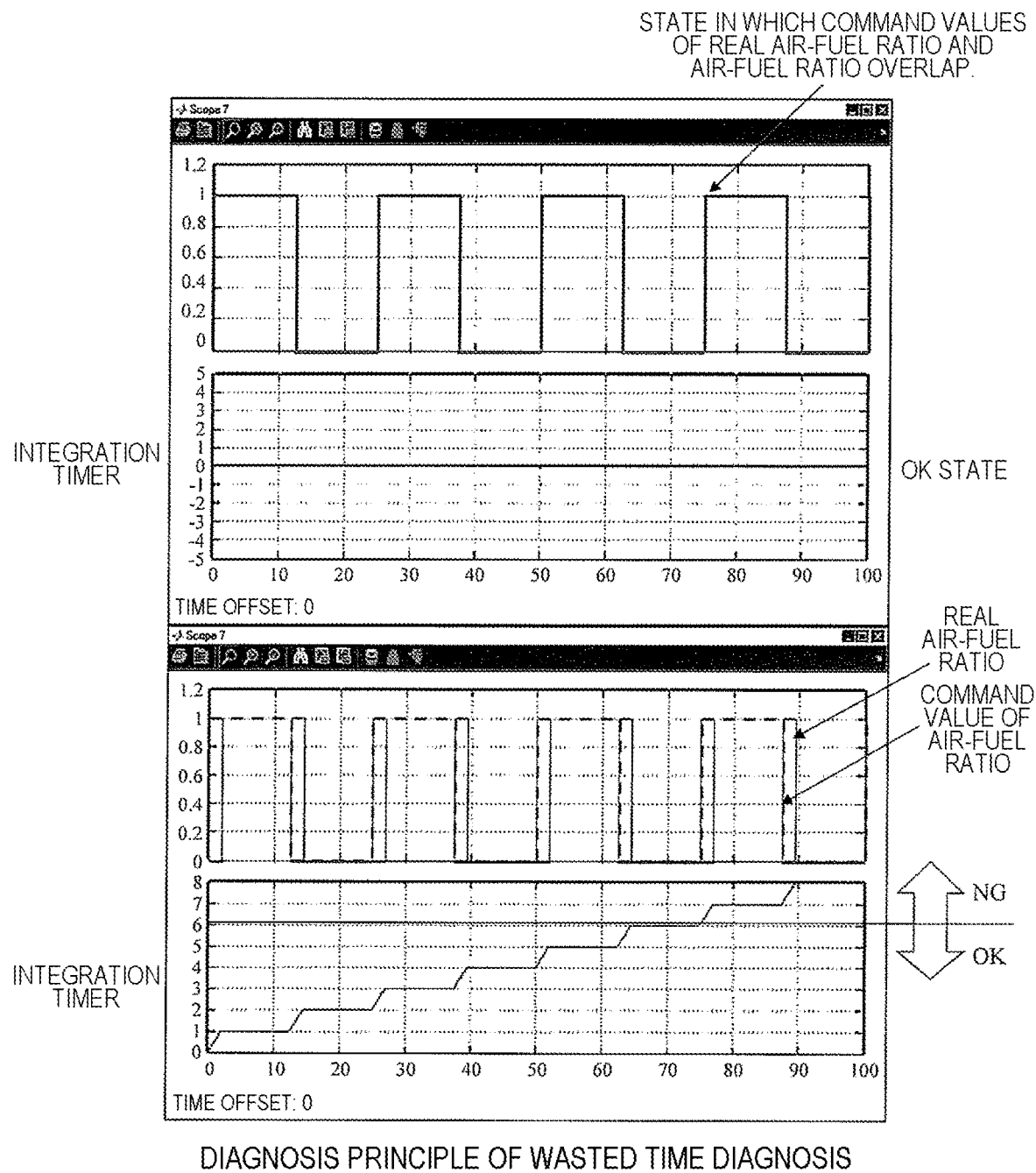
FIG. 15 is a diagram schematically illustrating a method of detecting a wasted time when a target air-fuel ratio sensor signal and the real air-fuel ratio sensor signal are rectangular waves.

FIG. 15 is a diagram schematically illustrating a method of detecting a wasted time when the target air-fuel ratio sensor signal and the real air-fuel ratio sensor signal are rectangular waves.

First, an integration timer is prepared in advance. If the target air-fuel ratio sensor signal and the real air-fuel ratio sensor signal overlap, the wasted time has not occurred and there is no time difference, so the integration timer is not counted.

On the other hand, when the real air-fuel ratio sensor signal deviates from the target air-fuel ratio sensor signal, the integration timer starts the count, and when the number of times the real air-fuel ratio sensor signal swings reaches N (diagnosis ends), the integration timer value is greater than the NG threshold value, and it is determined to be abnormal. Actually, since the target air-fuel ratio swings in a triangular wave, the wasted time delay as illustrated on the right of FIG. 4 occurs. Therefore, it is difficult and complicated to detect the wasted time by a simple method as illustrated in FIG. 15, and the improved method is required.

<Relationship Between Wasted Time and Deterioration Index of Air-Fuel Ratio Sensor in Failure Mode>

Figure 16:
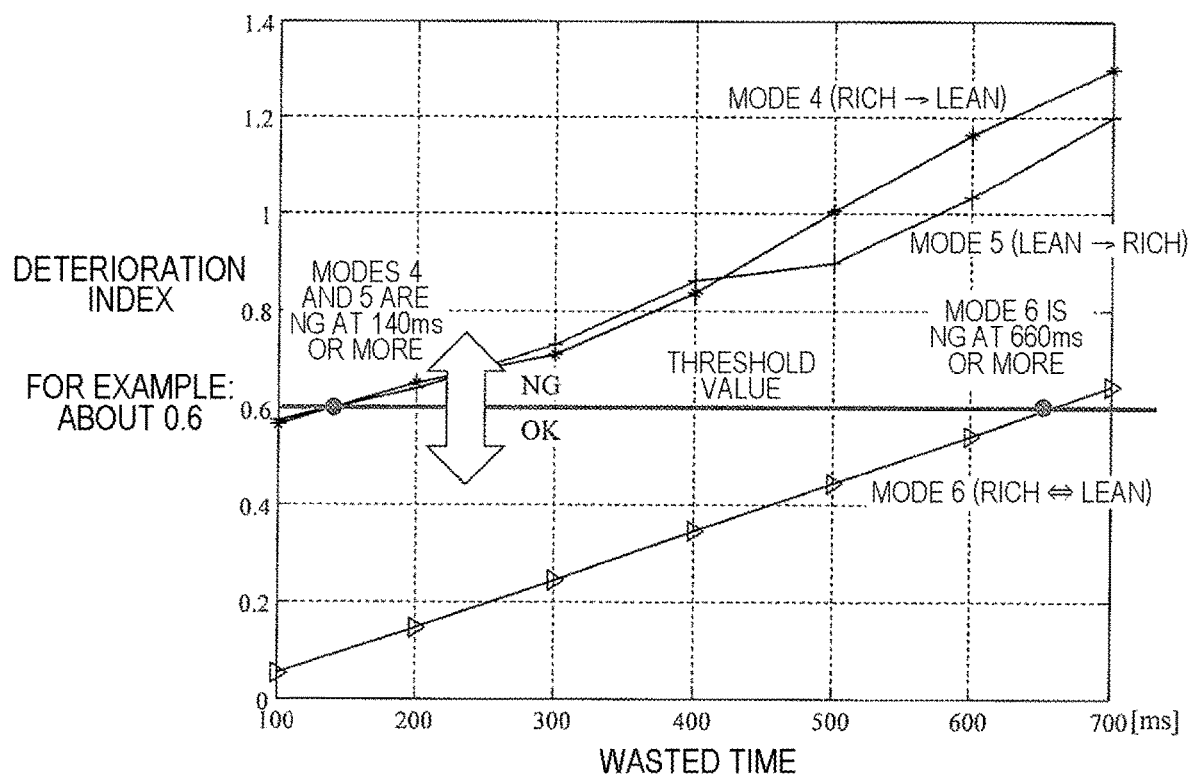
FIG. 16 is a diagram illustrating a relationship between a wasted time and a deterioration index (average value and the like of an integration timer) of the air-fuel ratio sensor 205 of the failure modes 4 to 6.

FIG. 16 is a diagram illustrating the relationship between the wasted time and the deterioration index (average value and the like of the integration timer) of the air-fuel ratio sensor 205 of the failure modes 4 to 6.

As illustrated in FIG. 16, the curves of the failure modes 4 to 5 overlap on the graph (failure mode 6 does not overlap). For example, when the threshold value is set to be 0.6, the failure modes 4 and 5 are determined as the NG at the same time, and any failure mode is not determined. Therefore, as in the case of the failure modes 1 to 3, it is necessary to clearly determine each failure modes 4 to 6 (wasted time delay).

<As to Determination of Failure Modes 4 to 6 in Air-Fuel Ratio Sensor>

FIG. 17 is a diagram for describing a method of determining failure modes 4 to 6 (wasted time deterioration) of the air-fuel ratio sensor 205. A determination process of the failure modes 4 to 6 is executed in the failure mode determination unit B110.

For the determination of the failure modes 4 to 6, the determination method from the differential value of the air-fuel ratio sensor 205 is adopted, which is the same as the failure modes 1 to 3. However, basically, in the failure modes 4 to 6, the positive and negative slopes do not change during the wasted time, and the slope is not a material for detection in terms of measuring the wasted time. Therefore, this time, a counter B with a zero slope is set. The counter B with the zero slope theoretically remains zero while the wasted time is occurring, but the actual air-fuel ratio sensor signal has a lot of noise, and thus the counter B with the zero slope is also incremented (by +1) while the wasted time is occurring. On the other hand, when the wasted time is added to the actual air-fuel ratio sensor signal, noise also appears, and there is a difference between a value of a counter B with a positive slope and a value of a counter B with a negative slope.

As a result of intensive research on these phenomena, the present inventor has found that the failure modes 4 to 6 can be determined by utilizing these phenomena. A combination of difference equations of the value of the counter B with the slope described above is used for the mode determination. Each counter with the slope is defined as (1), (2), and (3) below.

(1): Counter B with a zero slope B
(2): Counter B with a positive slope
(3): Counter B with a negative slope (i) Determination of failure mode 4

When (1)-(2)>constant (for example: 60) & (1)-(3)>constant (example: 60) & (2)-(3)≈constant (example: 0) is established, it is determined to be the failure mode 4. The value of the counter B with the zero slope is large, and the value of the counter B with the positive slope and the value of the counter B with the negative slope are substantially the same.

(ii) Determination of Failure Mode 5

(1)-(2)>constant (for example: 60) & (1)-(3)>constant (for example: 60) & (3)-(2)>constant (for example: 10)

When the above is established, it is determined to be the failure mode 5. The value of the counter B with the zero slope is large, and the difference between the value of the counter B with the negative slope and the value of the counter B with the positive slope is subtle, but the value of the counter B with the negative slope is larger.

(iii) Determination of Failure Mode 6

Other than the determination of the failure mode 4 and the failure mode 5, it is determined to be the failure mode 6.

Note that the final determination is performed when the number of times the real air-fuel ratio sensor signal swings reaches N (diagnosis ends).

Figure 18:
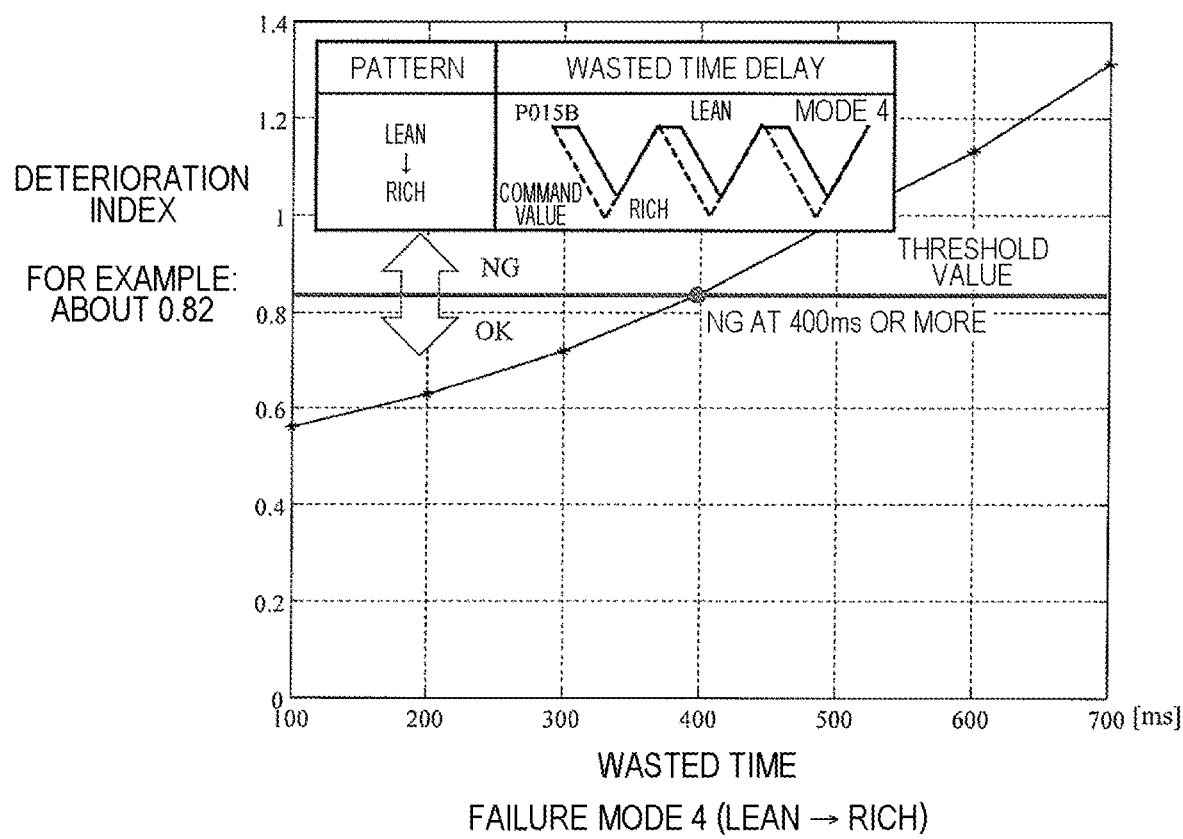
FIG. 18 is a diagram illustrating a relationship between a wasted time index and the wasted time at the time of the failure mode 4.
Figure 19:
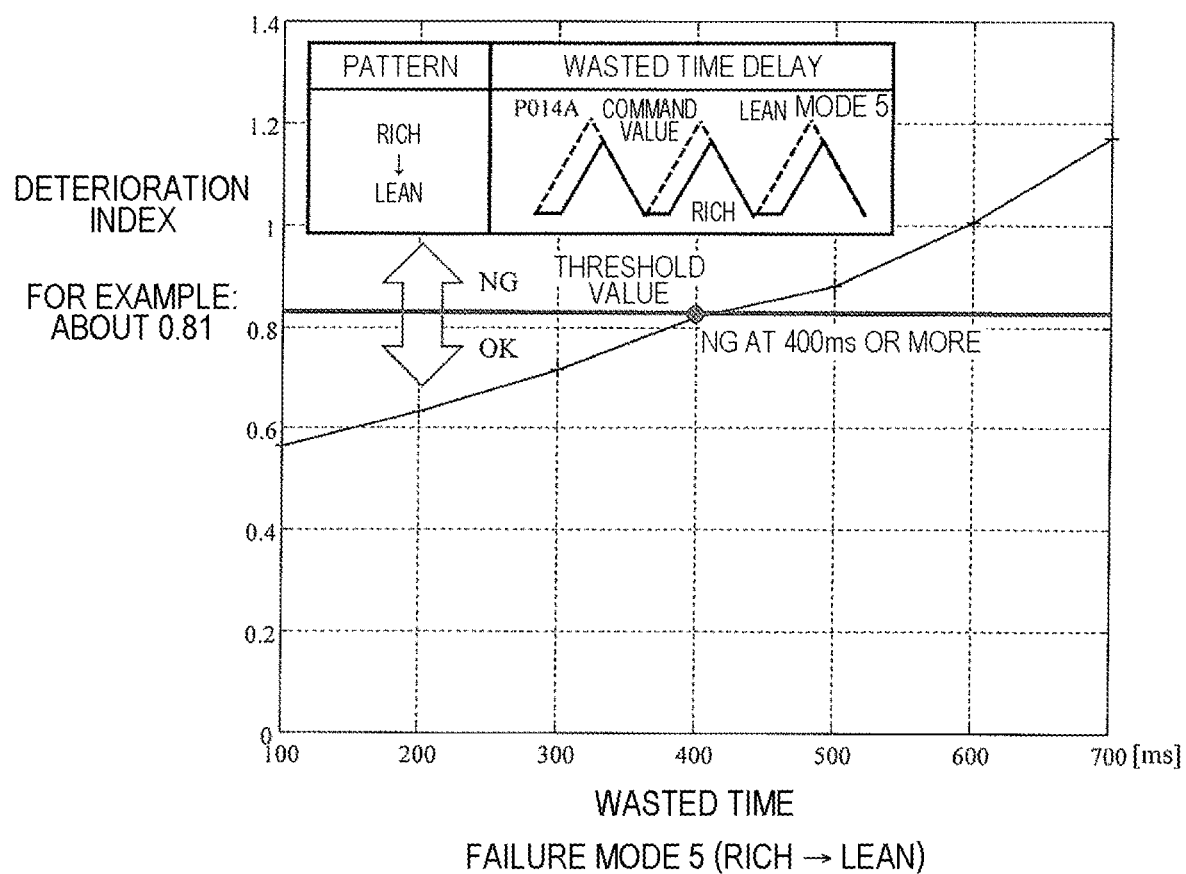
FIG. 19 is a diagram illustrating the relationship between the wasted time index and the wasted time at the time of the failure mode 5.
Figure 20:
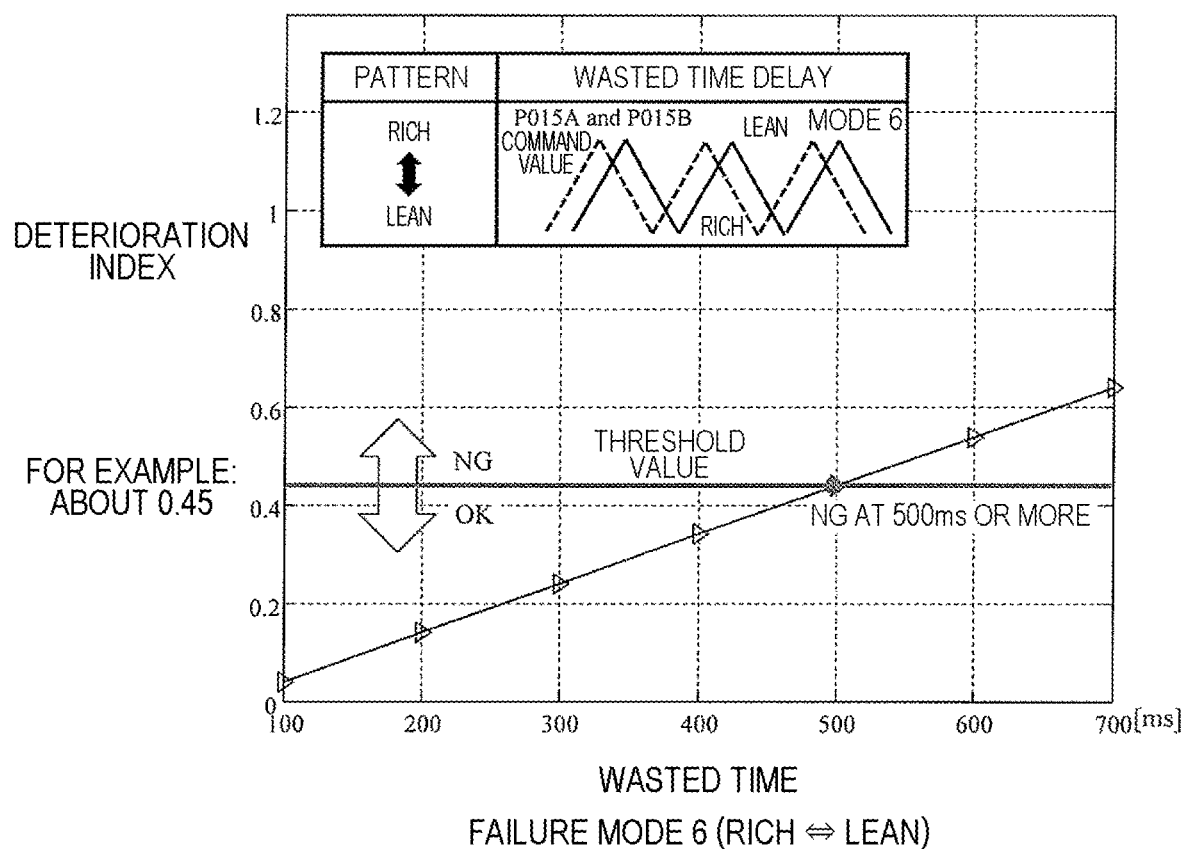
FIG. 20 is a diagram illustrating the relationship between the wasted time index and the wasted time at the time of the failure mode 6.

As a result, it is possible to determine the failure modes 4 to 6. Therefore, when the failure modes are illustrated in the drawings once again, these failure modes are as illustrated in FIGS. 18, 19, and 20.

Unlike FIG. 16, since the threshold value based on the OBD regulation can be set for each failure mode, when it is greater than the threshold value, it can be determined to be abnormal. As an example, in FIG. 18, when the deterioration index (average value and the like of the integration timer) is greater than 0.82 (T=400 ms), it is determined that the failure mode 4 is abnormal, in FIG. 19, when the deterioration index (average value and the like of the integration timer) is greater than 0.81 (t=400 ms), it is determined that the failure mode 5 is abnormal, and in FIG. 20, when the deterioration index (average value and the like of the integration timer) is greater than 0.45 (τ=500 ms), it is determined that the failure mode 6 is abnormality.

Figure 21:
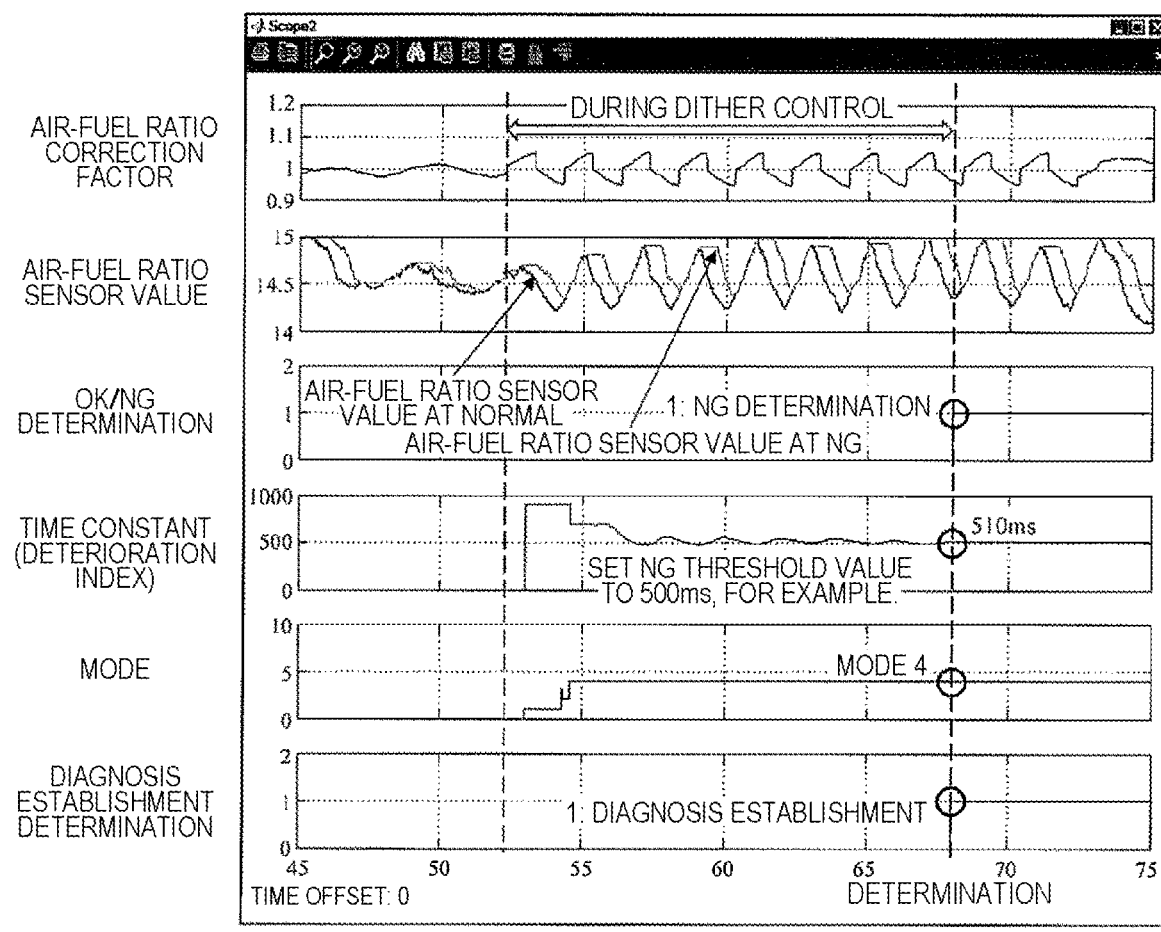
FIG. 21 is a diagram illustrating a determination result at the time of the failure mode 4.
Figure 22:
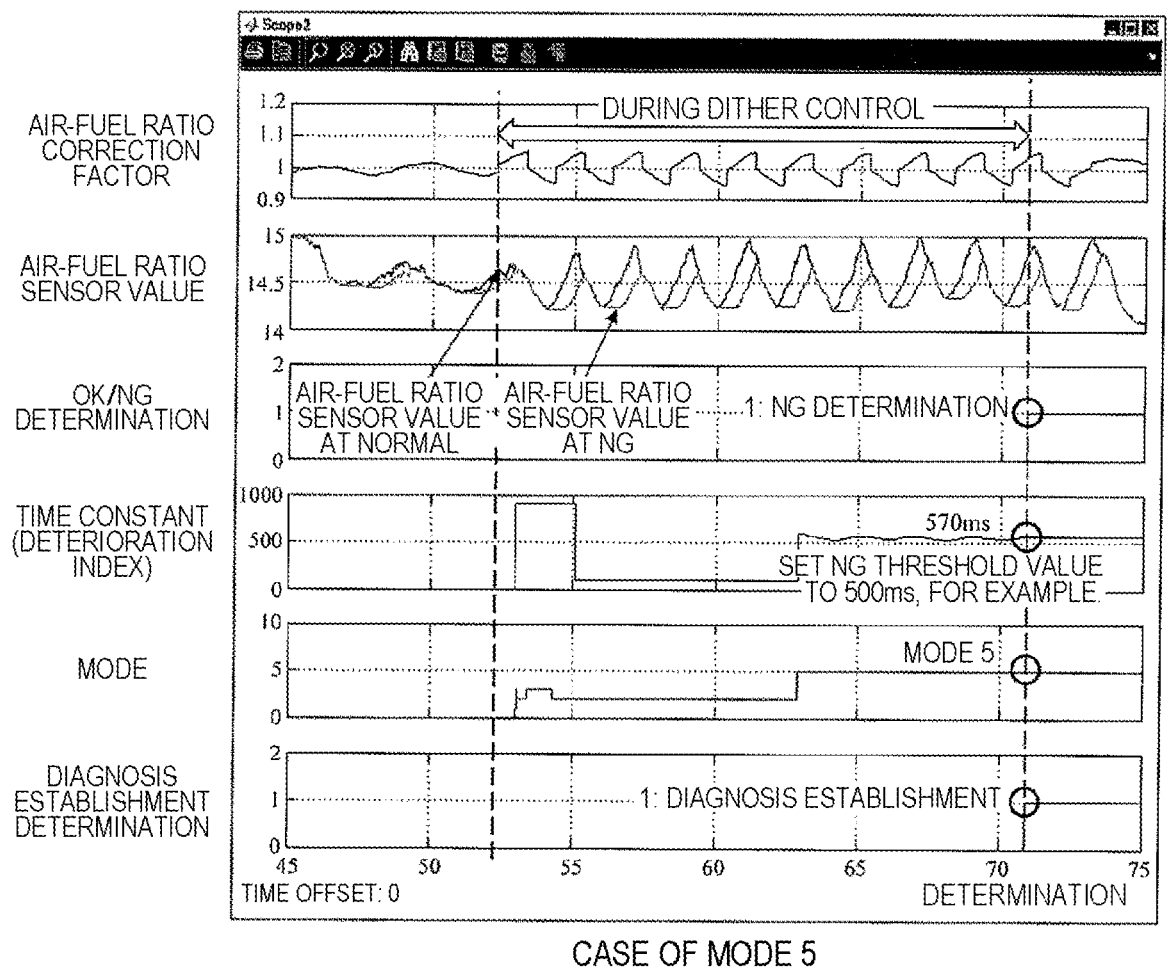
FIG. 22 is a diagram illustrating a determination result at the time of the failure mode 5.
Figure 23:
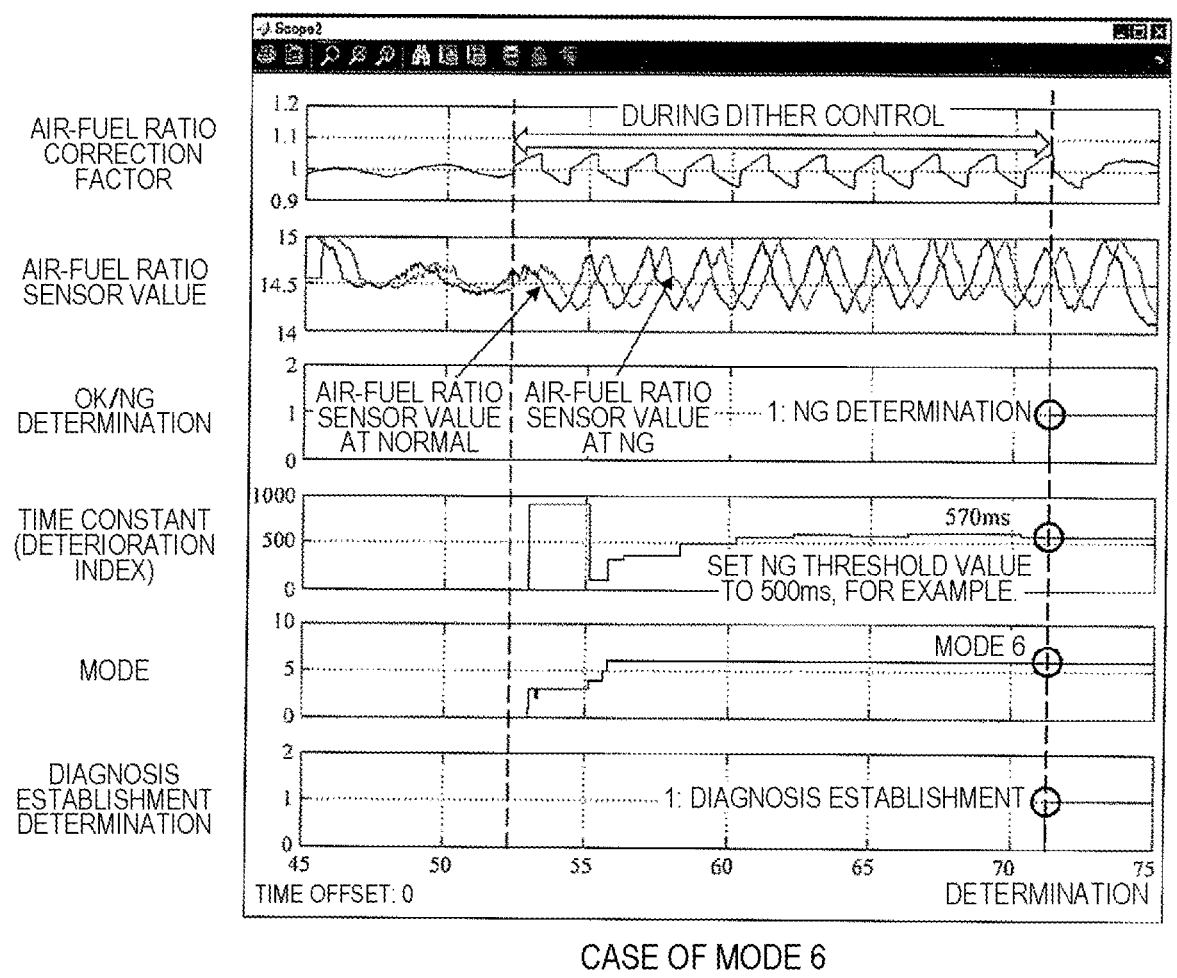
FIG. 23 is a diagram illustrating a determination result at the time of the failure mode 6.

Therefore, although it is a desk simulation, the actual air-fuel ratio sensor signal deteriorates to verify detection performance. FIGS. 21, 22, and 23 each are diagrams illustrating the determination results of the failure modes 4 to 6. Here, for example, the target air-fuel ratio change unit 102 swings an air-fuel ratio correction coefficient larger than the normal control (dither control), and verifies the detection (diagnosis) performance (whether it can be actually detected (diagnosed)) of the mode determination and the abnormality determination from the behavior of the real air-fuel ratio sensor signal by the above-described method.

In FIG. 21, in the case of the failure mode 4, the NG threshold value is set to be 500 ms, and the lean→rich wasted time is set to be 600 ms. From FIG. 21, it can be seen that since the failure mode is determined to be "4" and the wasted time is greater than the NG threshold value (500 ms), it is determined to be NG. However, the calculated wasted time should be 600 ms, but is 510 ms, which is considered to be the effect of the calculation error.

In FIG. 22, in the case of the failure mode 5, the NG threshold value is set to be 500 ms, and the rich→lean wasted time is similarly set to be 600 ms. From FIG. 22, it can be seen that since the failure mode is determined to be "5" and the wasted time is greater than the NG threshold value (500 ms), it is determined to be NG. This also has a calculation error, which is 570 ms for the setting of 600 ms.

In FIG. 23, in the case of the failure mode 6, the NG threshold value is set to be 500 ms, and the lean⇔rich wasted time is similarly set to be 600 ms. From FIG. 23, it can be seen that since the failure mode is determined to be "6" and the wasted time is greater than the NG threshold value (500 ms), the failure mode is determined to be NG. This also has a calculation error, which is 570 ms for the setting of 600 ms.

From the above, it is possible to perform the determination of the failure modes 1 to 6 and the normal or abnormal determination.

<Diagnosis Area Determination Process>

Figure 24:
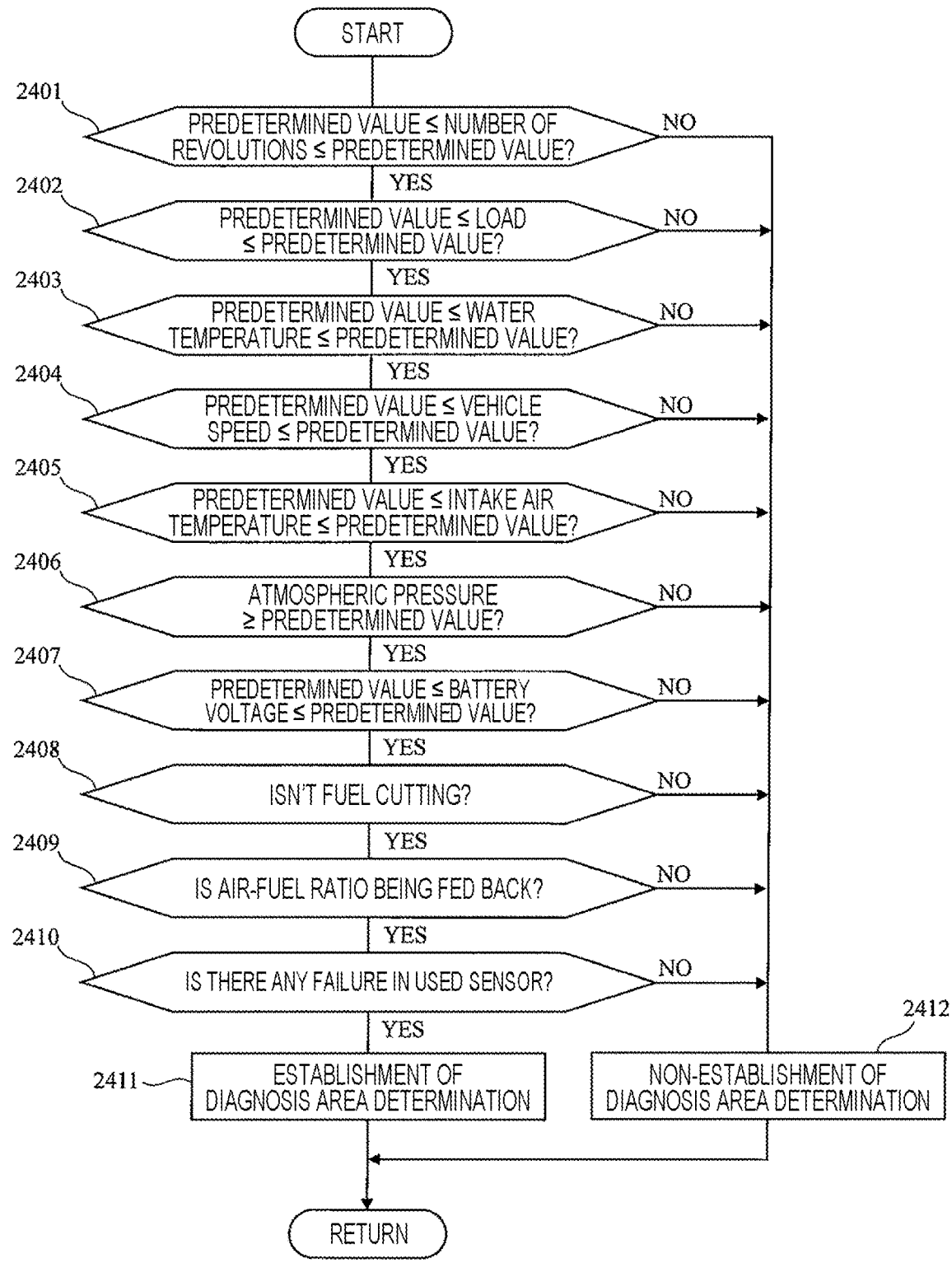
FIG. 24 is a flowchart for describing a diagnosis area (diagnosis condition establishment) determination process according to the present embodiment.

FIG. 24 is a flowchart for describing the diagnosis area (diagnosis condition establishment) determination process according to the present embodiment. In the following description, the diagnosis area determination unit 101 is an operating subject, but since the diagnosis area determination unit 101 is configured in the MPU2071, the MPU2071 may be read as an operating subject.

From step 2401 to step 2410, the diagnosis area determination unit 101 checks whether the number of revolutions of the internal combustion engine is within a predetermined range (step 2401), whether a load of the internal combustion engine is within a predetermined range (step 2402), whether water temperature is within a predetermined range (step 2403), whether a vehicle speed is within a predetermined range (step 2404), whether intake air temperature is within a predetermined range (step 2405), whether an atmospheric pressure is equal to or greater than a predetermined value (step 2406), whether a battery voltage is within a predetermined range (step 2407), whether fuel is being cut (step 2408), whether an air-fuel ratio control feedback is being performed (step 2409), and whether there is a failure in a sensor used (step 2410), respectively.

If all conditions of steps 2401 to 2410 are established (Yes in all of steps 2401 to 2410), in step 2411, the diagnosis area determination unit 101 is determined to be in the diagnosis area (diagnosis condition establishment). If one of the conditions of steps 2401 to 2410 is not established (No in any of steps 2401 to 2410), in step 2412, the diagnosis area determination unit 101 determines that the diagnosis area is not established (diagnosis condition is not established).

<Real Air-Fuel Ratio Sensor Signal Acquisition Process>

Figure 25:
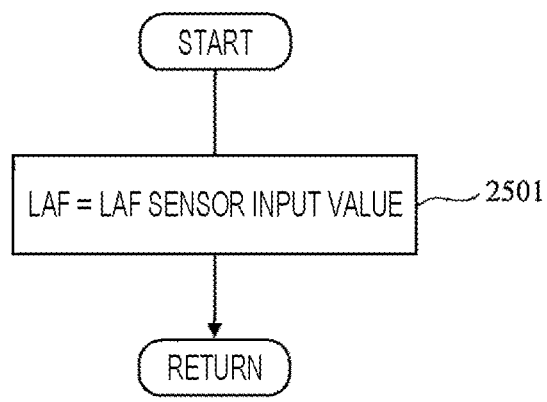
FIG. 25 is a flowchart for describing a real air-fuel ratio sensor signal acquisition process.

FIG. 25 is a flowchart for describing a real air-fuel ratio sensor signal acquisition process. The real air-fuel ratio sensor signal acquisition process is a process of storing the air-fuel ratio sensor signal in a RAM of the internal combustion engine control device 207. Here, the air-fuel ratio sensor signal is input every 4 ms.

The present embodiment illustrates an example of operating at a 4 ms task, but is not limited thereto.

<Dither Control Process>

Figure 26:
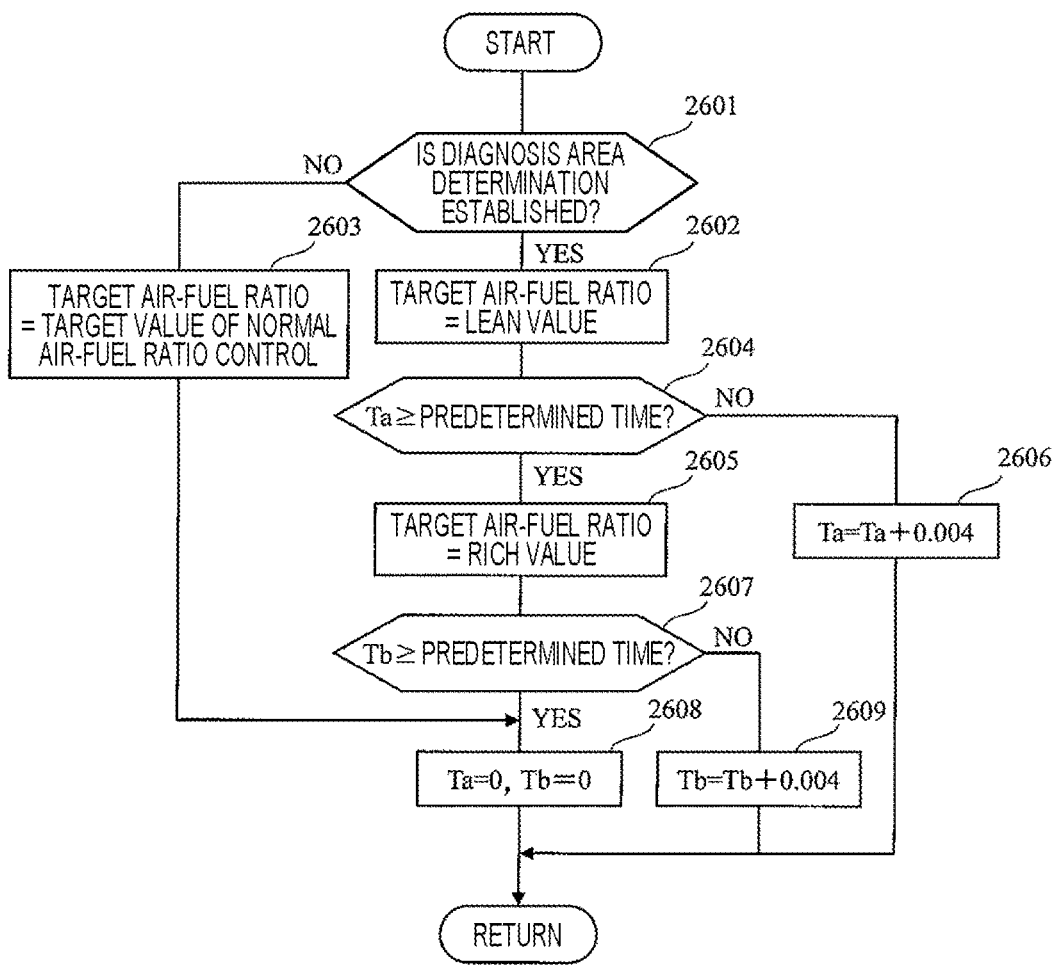
FIG. 26 is a flowchart for describing control (dither control process) that swings a target air-fuel ratio at each predetermined time according to the present embodiment.

FIG. 26 is a flowchart for describing control (dither control process) that swings a target air-fuel ratio at each predetermined time according to the present embodiment. In the following explanation, the target air-fuel ratio change unit 102 is an operating subject, but since the target air-fuel ratio change unit 102 is configured in the MPU2071, the MPU2071 may be read as an operating subject.

(i) Step 2601

The target air-fuel ratio change unit 102 acquires the determination result of whether the diagnosis area (diagnosis condition) is established from the diagnosis area determination unit 101, and determines whether to continue the process. If the diagnosis area is not established (No in step 2601), the process proceeds to step 2603. If the diagnosis area is established (Yes in step 2601), the process proceeds to step 2602.

(ii) Step 2602

The target air-fuel ratio change unit 102 sets the target air-fuel ratio to be a lean value.

(iii) Step 2603

The target air-fuel ratio change unit 102 calculates the target air-fuel ratio with the normal air-fuel ratio feedback control. After the calculation, the process proceeds to step 2608.

(iv) Step 2604

The target air-fuel ratio change unit 102 checks if a timer Ta reaches a predetermined time. If the timer Ta reaches the predetermined time (Yes in step 2604), the process proceeds to step 2605. If the timer Ta does not reach the predetermined time (No in step 2604), the process proceeds to step 2606.

(v) Step 2605

The target air-fuel ratio change unit 102 sets the target air-fuel ratio to be a rich value.

(vi) Step 2606

The target air-fuel ratio change unit 102 adds 4 ms to Ta.

(vii) Step 2607

The target air-fuel ratio change unit 102 checks if a timer Tb reaches the predetermined time. If the timer Tb reaches the predetermined time (Yes in step 2607), the process proceeds to step 2608. If the timer Tb does not reach the predetermined time (No in step 2607), the process proceeds to step 2609.

(viii) Step 2608

The target air-fuel ratio change unit 102 clears the timers Ta and Tb to zero.

(ix) Step 2609

The target air-fuel ratio change unit 102 adds 4 ms to Tb.

<Real Air-Fuel Ratio Sensor Signal Inversion Frequency Detection Process>

Figure 27:
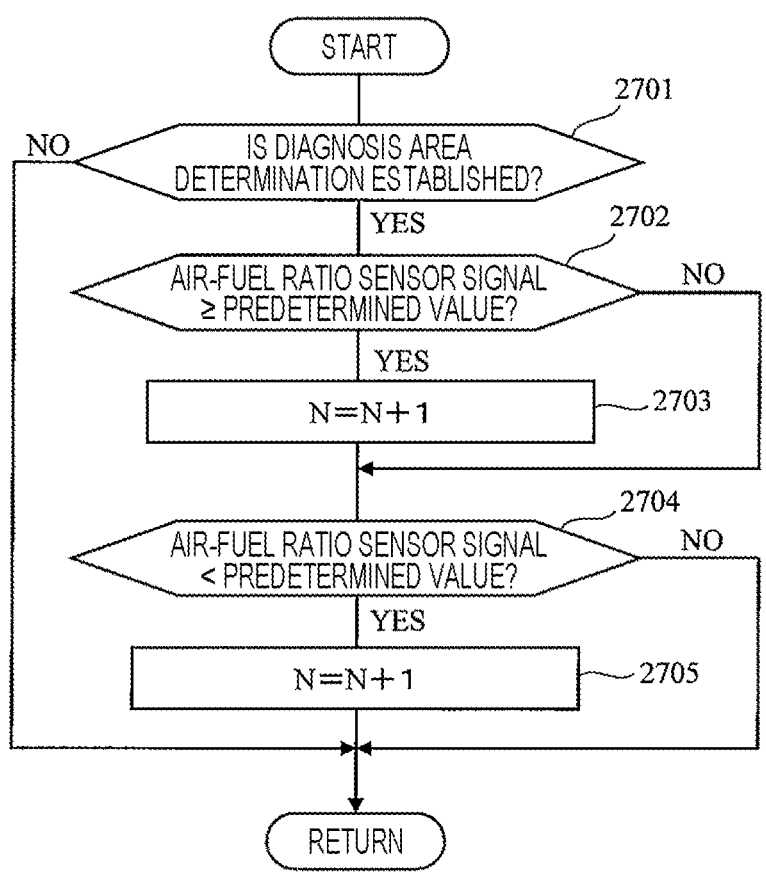
FIG. 27 is a flowchart for describing a process (real air-fuel ratio sensor signal inversion frequency detection process) of detecting an inversion frequency N of the real air-fuel ratio sensor signal.

FIG. 27 is a flowchart for describing a process (real air-fuel ratio sensor signal inversion frequency detection process) of detecting an inversion frequency N of the real air-fuel ratio sensor signal. In the following description, the real air-fuel ratio change unit 103 is an operating subject, but since the real air-fuel ratio change unit 103 is configured in the MPU2071, the MPU2071 may be read as an operating subject.

(i) Step 2701

The real air-fuel ratio detection unit 103 acquires the determination result of whether the diagnosis area (diagnosis condition) is established from the diagnosis area determination unit 101, and determines whether to continue the process. If the diagnosis area is established (Yes in step 2701), the process proceeds to step 2702. If the diagnosis area is not established (No in step 2701), the real air-fuel ratio sensor signal inversion frequency detection process ends and proceeds to the next task.

(ii) Step 2702

The real air-fuel ratio detection unit 103 determines whether the air-fuel ratio sensor signal is equal to or greater than a predetermined value. If the real air-fuel ratio sensor signal is equal to or greater than the predetermined value (Yes in step 2702), the process proceeds to step 2703. If the real air-fuel ratio sensor signal is not equal to or greater than the predetermined value (No in step 2702), the process proceeds to step 2704.

(iii) Step 2703

The real air-fuel ratio detection unit 103 increments N.

(iv) Step 2704

The real air-fuel ratio detection unit 103 determines whether the real air-fuel ratio sensor signal is less than a predetermined value.

If the real air-fuel ratio sensor signal is less than the predetermined value (Yes in step 2704), the process proceeds to step 2705. If the real air-fuel ratio sensor signal is not less than the predetermined value (No in step 2704), the process proceeds to step 2701.

(v) Step 2705

The real air-fuel ratio detection unit 103 increments N.

<Failure Mode Determination Process A>

Figure 28:
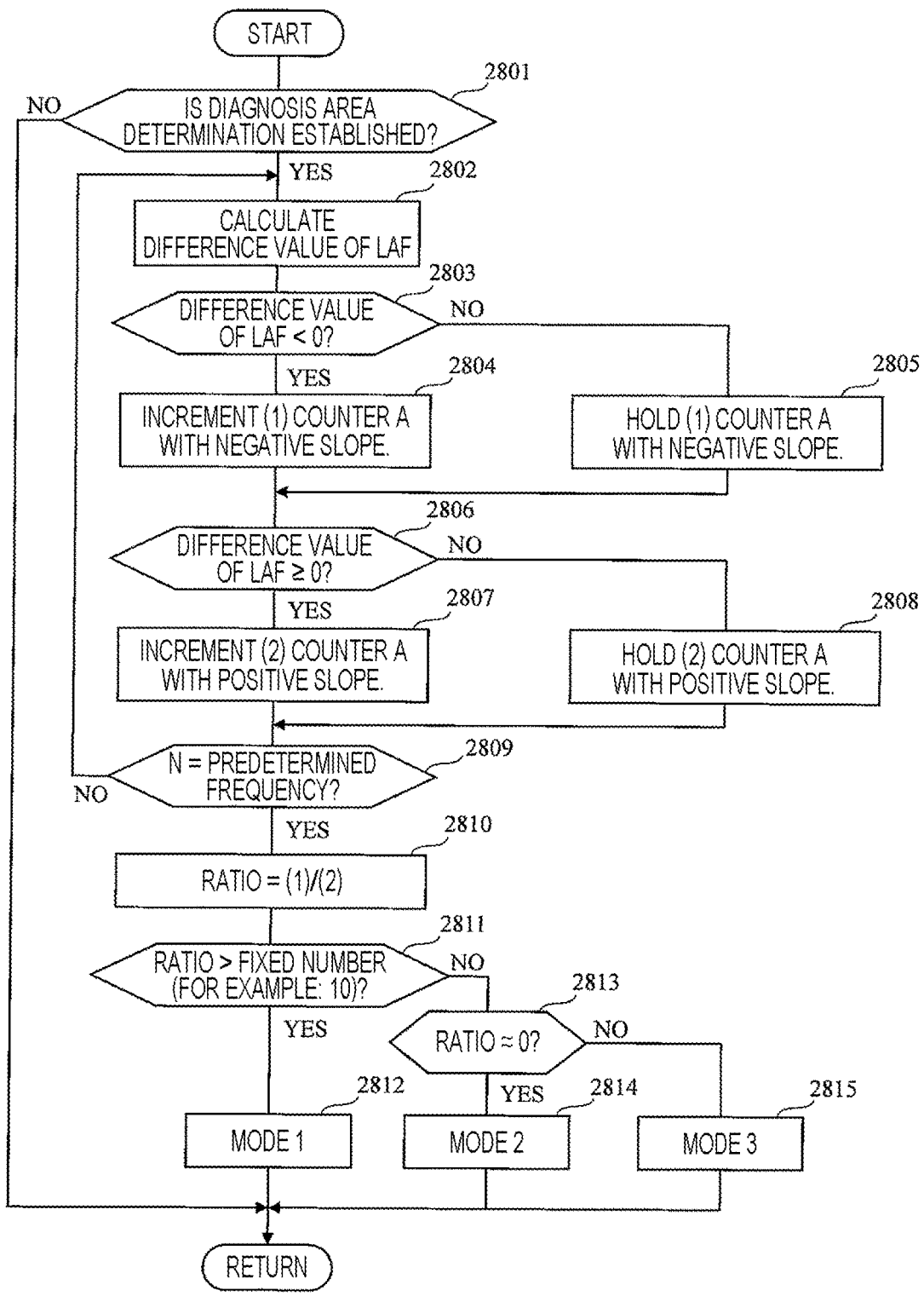
FIG. 28 is a flowchart for describing a process (failure mode determination process A) of determining the failure modes 1 to 3 according to the present embodiment.

FIG. 28 is a flowchart for describing the process of determining the failure modes 1 to 3 according to the present embodiment (failure mode determination process A) (corresponding to the process of failure mode determination unit A109 in FIG. 1). In the following description, the failure mode determination unit A109 is an operating subject, but since the failure mode determination unit A109 is configured in the MPU2071, the MPU2071 may be read as an operating subject.

(i) Step 2801

The failure mode determination unit A109 acquires the determination result of whether the diagnosis area (diagnosis condition) is established from the diagnosis area determination unit 101, and determines whether to continue the process.

If the diagnosis area is established (Yes in step 2801), the process proceeds to step 2802. If the diagnosis area is not established (No in step 2801), the failure mode determination process A ends and proceeds to the next task.

(ii) Step 2802

The failure mode determination unit A109 calculates the difference value of the real air-fuel ratio sensor signal (LAF).

(ii) Step 2803

The failure mode determination unit A109 determines that the difference value of the real air-fuel ratio sensor signal (LAF) is less than zero. If the difference value is less than zero (Yes in step 2803), the process proceeds to step 2804. If the difference value is equal to or greater than zero (No in step 2803), the process proceeds to step 2805.

(iv) Step 2804

The failure mode determination unit A109 increments the counter A with the "negative" slope.

(v) Step 2805

The failure mode determination unit A109 retains the counter A with the "negative" slope.

(vi) Step 2806

The failure mode determination unit A109 determines that the difference value of the real air-fuel ratio sensor signal (LAF) is equal to or greater than zero. If the difference value is equal to or greater than zero (Yes in step 2806), the process proceeds to step 2807. If the difference value is less than zero (No in step 2806), the process proceeds to step 2808.

(vii) Step 2807

The failure mode determination unit A109 increments the counter A with the "positive" slope.

(viii) Step 2808

The failure mode determination unit A109 retains the counter A with the "positive" slope.

(ix) Step 2809

The failure mode determination unit A109 acquires the value of the inversion frequency N of the real air-fuel ratio sensor signal from the real air-fuel ratio detection unit 103, and determines whether the N reaches the predetermined frequency. If the N reaches the predetermined frequency (Yes in step 2808), the process proceeds to step 2810. If the N does not reach the predetermined frequency (No in step 2808), the process proceeds to step 2803.

(x) Step 2810

The failure mode determination unit A109 divides the value of the counter A with the "negative" slope by the value of the counter A with the "positive" slope (ratio calculation).

(xi) Step 2811

The failure mode determination unit A109 determines whether the ratio calculated in step 2810 is greater than a constant (for example: 10). If the ratio is greater than the constant (for example: 10) (Yes in step 2811), the process proceeds to step 2812. If the ratio is equal to or less than the constant (for example: 10) (No in step 2811), the process proceeds to step 2813.

(xii) Step 2812

The failure mode determination unit A109 determines the failure mode 1.

(xiii) Step 2813

The failure mode determination unit A109 checks whether the ratio is near zero. If it is determined that the ratio is near zero (Yes in step 2813), the process proceeds to step 2814. If it is determined that the ratio is not near zero (ratio: 1: No in step 2813), the process proceeds to step 2815.

(xiv) Step 2814

The failure mode determination unit A109 determines the failure mode 1.

(xv) Step 2815

The failure mode determination unit A109 determines the failure mode 3.

<Response Time Constant Detection Process>

Figure 29:
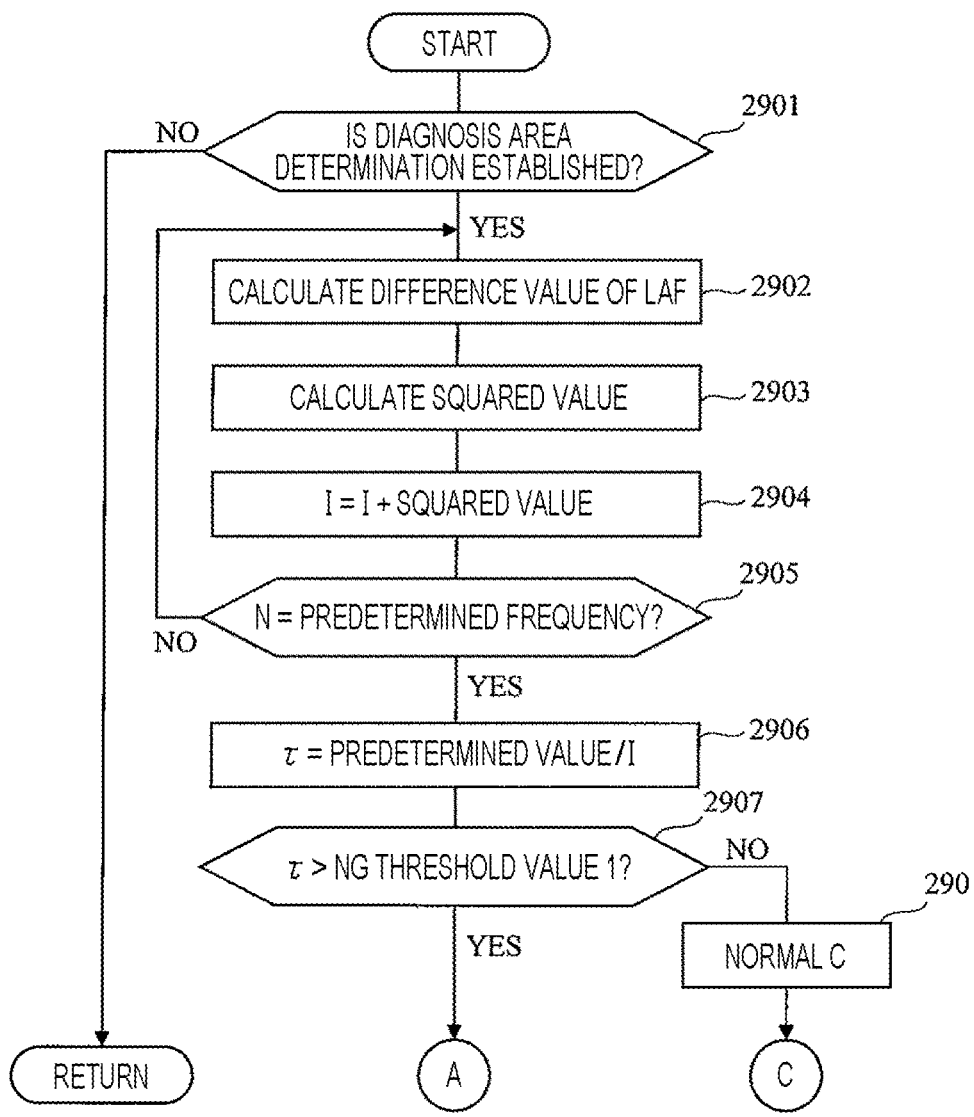
FIG. 29 is a flowchart for describing a process (response time constant detection process) of detecting a response time constant according to the present embodiment.

FIG. 29 is a flowchart for describing a process (response time constant detection process) of detecting a response time constant according to the present embodiment. In the following explanation, the response time constant detection unit 105 or the response time constant delay abnormality detection unit 107 is an operating subject, but since response time constant detection unit 105 or the response time constant delay abnormality detection unit 107 are configured in the MPU2071, the MPU2071 may be read as an operating subject.

(i) Step 2901

The response time constant detection unit 105 acquires the determination result of whether the diagnosis area (diagnosis condition) is established from the diagnosis area determination unit 101, and determines whether to continue the process. When the diagnosis area is established (Yes in step 2901), the process proceeds to step 2902. When the diagnosis area is not established (No in step 2901), the response time constant detection process ends and proceeds to the next task.

(ii) Step 2902

The response time constant detection unit 105 calculates the difference value of the real air-fuel ratio sensor signal (LAF).

(iii) Step 2903

The response time constant detection unit 105 squares the difference value calculated in step 2902.

(iv) Step 2904

The response time constant detection unit 105 performs a calculation of I (previous value)+the squared value on variable I (the initial value of I is zero).

(v) Step 2905

The response time constant detection unit 105 determines whether the inversion frequency N of the real air-fuel ratio sensor signal reaches a predetermined frequency. When N reaches a predetermined frequency (Yes in step 2905), the process proceeds to step 2906. When N does not reach a predetermined frequency (No in step 2905), the process proceeds to step 2902.

(vi) Step 2906

The response time constant detection unit 105 divides a predetermined value (constant) by I and calculates the time constant T.

(vii) Step 2907

The response time constant delay abnormality detection unit 107 determines whether the time constant τ calculated in step 2907 is greater than the NG threshold value 1. When the time constant i is greater than the NG threshold value 1 (Yes in step 2907), the process proceeds to A (see FIG. 32), and the mode determination process is further performed. If the time constant τ is equal to or less than the NG threshold value 1 (No in step 2907), the process proceeds to step 2908.

(viii) Step 2908

The response time constant delay abnormality detection unit 107 determines that the state of the air-fuel ratio sensor 205 is normal C. In this case, the process further proceeds to C (see FIG. 32). The normal C means that the result of the response time constant diagnosis is normal. In this case, since it is unclear whether the wasted time diagnosis is normal, the process proceeds to C (see FIG. 32) and a further determination is made.

<Failure Mode Determination Process B>

Figure 30:
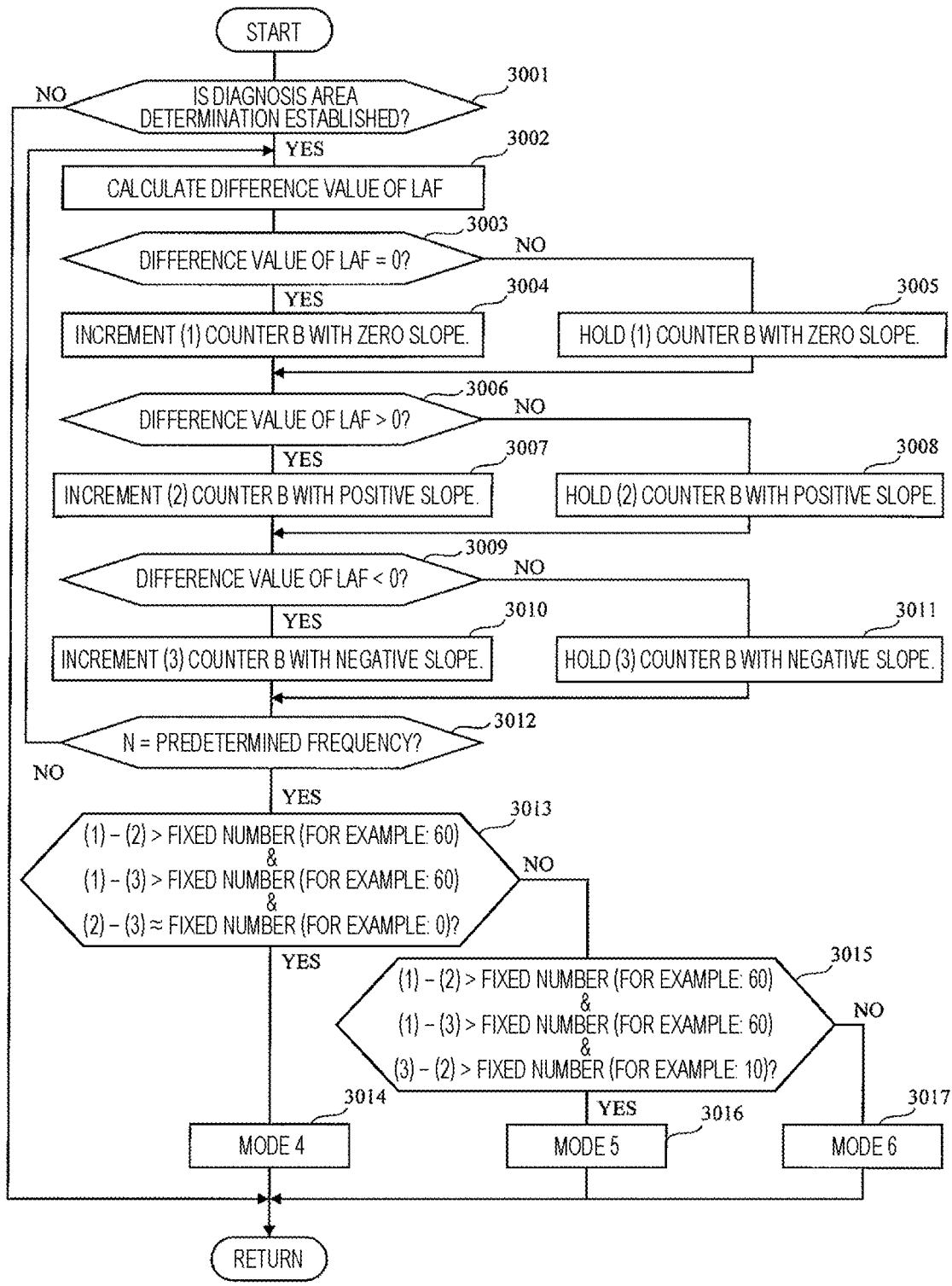
FIG. 30 is a flowchart for describing a process of determining the failure modes 4 to 6 (failure mode determination process B).

FIG. 30 is a flowchart for describing the process of determining the failure modes 4 to 6 (failure mode determination process B) (corresponding to the failure mode determination unit B110 of FIG. 1). In the following description, the failure mode determination unit B110 is an operating subject, but since the failure mode determination unit B110 is configured in the MPU2071, the MPU2071 may be read as an operating subject.

(i) Step 3001

The failure mode determination unit B110 acquires the determination result of whether the diagnosis area (diagnosis condition) is established from the diagnosis area determination unit 101, and determines whether to continue the process.

When the diagnosis area is established (Yes in step 3001), the process proceeds to step 3002. When the diagnosis area is not established (No in step 3001), the failure mode determination process A ends and proceeds to the next task.

(ii) Step 3002

The failure mode determination unit B110 calculates the difference value of the real air-fuel ratio sensor signal (LAF).

(iii) Step 3003

The failure mode determination unit B110 determines whether the difference value calculated in step 3002 is zero. If it is determined that the difference value is zero (Yes in step 3003), the process proceeds to step 3004. If it is determined that the difference value is not zero (No in step 3003), the process proceeds to step 3005.

(iv) Step 3004

The failure mode determination unit B110 increments a counter B with a zero slope.

(v) Step 3005

The failure mode determination unit B110 retains the counter B with the zero slope.

(vi) Step 3006

The failure mode determination unit B110 checks whether the difference value is greater than zero. If it is determined that the difference value is greater than zero (Yes in step 3006), the process proceeds to step 3007. If it is determined that the difference value is less than zero (No in step 3006), the process proceeds to step 3008.

(vii) Step 3007

The failure mode determination unit B110 increments a counter B with a positive slope.

(viii) Step 3008

The failure mode determination unit B110 retains the counter B with the positive slope.

(ix) Step 3009

The failure mode determination unit B110 determines whether the difference value is less than zero. If it is determined that the difference value is less than zero (Yes in step 3009), the process proceeds to step 3010. If it is determined that the difference value is equal to or greater than zero (No in step 3009), the process proceeds to step 3011.

(x) Step 3010

The failure mode determination unit B110 increments a counter B with a negative slope.

(xi) Step 3011

The failure mode determination unit B110 retains the counter B with the negative slope.

(xii) Step 3012

The failure mode determination unit B110 determines whether the inversion frequency N of the real air-fuel ratio sensor signal reaches the predetermined frequency. When N reaches a predetermined frequency (Yes in step 3012), the process proceeds to step 3013. When N does not reach a predetermined frequency (No in step 3012), the process proceeds to step 3002.

(xiii) Step 3013

The failure mode determination unit B110 determines whether a combination of the difference equations of the counter B with the zero slope, the counter B with the positive slope, and the counter B with the negative slope is established. That is, when (1) is the counter B with the zero slope, (2) is the counter B with the positive slope, and (3) is the counter B with the negative slope, it is determined whether (1)-(2)>constant (for example: 60), and (1)-(3)>constant (for example: 60), and (2)-(3)≈constant (for example: 0). The value of the counter B with the zero slope is large, and the value of the counter B with the positive slope and the value of the counter B with the negative slope are substantially the same.

When the combination of the difference equations is established (Yes in step 3013), the process proceeds to step 3014. When the combination of the difference equations is not established (No in step 3013), the process proceeds to step 3015.

(xiv) Step 3014

The failure mode determination unit B110 determines that the air-fuel ratio sensor 205 is in the failure mode 4.

(xv) Step 3015

The failure mode determination unit B110 determines whether a combination of the difference equations of the counter B with the zero slope, the counter B with the positive slope, and the counter with the negative slope is established, unlike the combination of the difference equations used in step 3013. That is, it is determined whether (1)-(2)>constant (for example: 60), and (1)-(3)>constant (example: 60), and (3)-(2)>constant (for example: 10). The value of the counter B with the zero slope is large, and the difference between the value of the counter B with the negative slope and the value of the counter B with the positive slope is subtle, but the value of the counter B with the negative slope is larger. When the combination of the difference equations is established (Yes in step 3015), the process proceeds to step 3016. When the combination of the difference equations is not established (No in step 3015), the process proceeds to step 3017.

(xvi) Step 3016

The failure mode determination unit B110 determines that the air-fuel ratio sensor 205 is in the failure mode 5.

(xvii) Step 3017

The failure mode determination unit B110 determines that the air-fuel ratio sensor 205 is in the failure mode 6.

<Wasted Time Detection Process>

Figure 31:
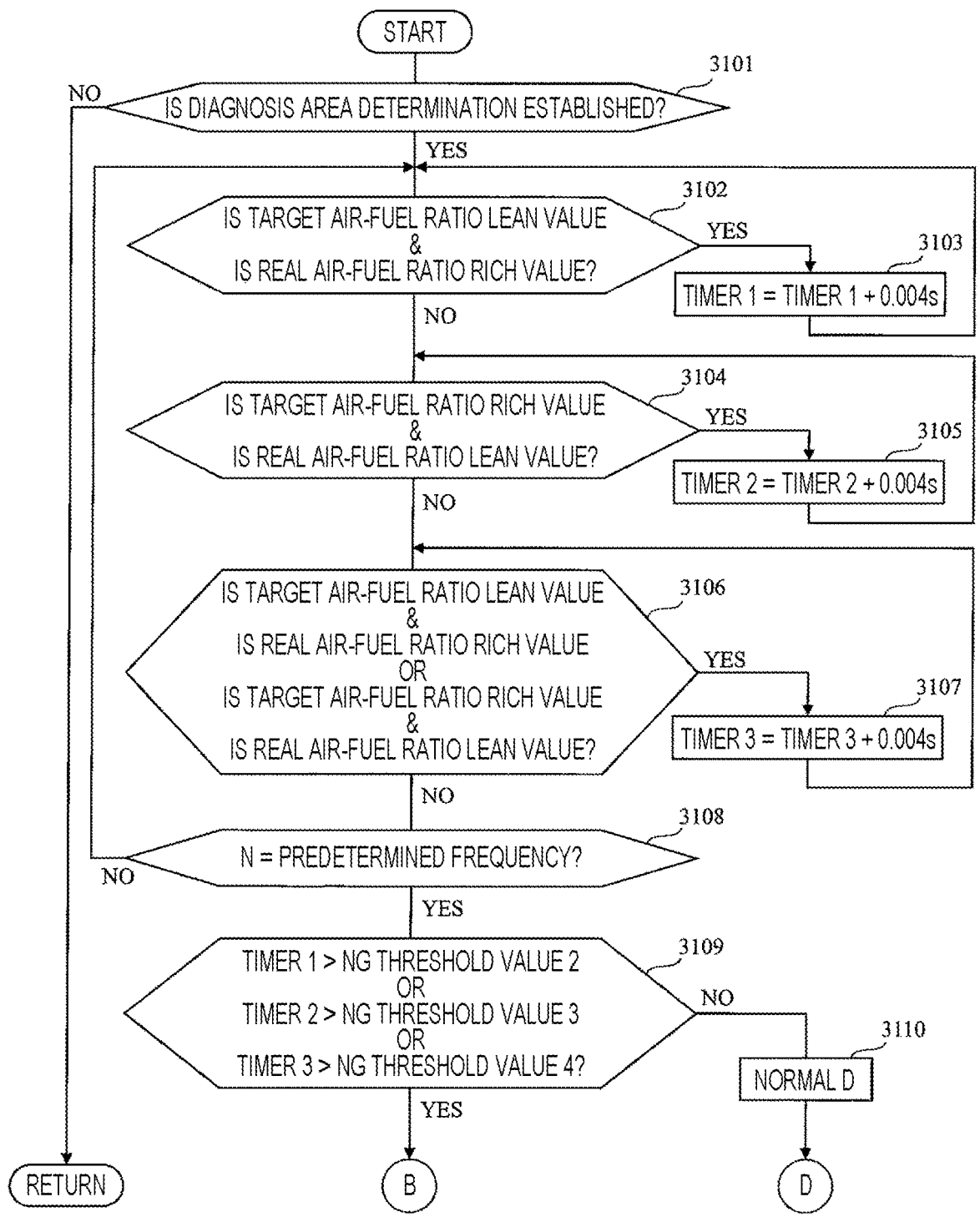
FIG. 31 is a flowchart for describing a process (wasted time detection process) of detecting the wasted time according to the present embodiment.

FIG. 31 is a flowchart for describing a process (wasted time detection process) of detecting the wasted time according to the present embodiment. In the following explanation, the wasted time detection unit 106, the wasted time delay abnormality detection unit 108, or the response deterioration abnormality determination unit B112 is an operating subject, but the wasted time detection unit 106, the wasted time delay abnormality detection unit 108, or the response deterioration abnormality determination unit B112 is configured in the MPU2071, so the MPU2071 may be read as an operating subject.

(i) Step 3101

The wasted time detection unit 106 acquires the determination result of whether the diagnosis area (diagnosis condition) is established from the diagnosis area determination unit 101, and determines whether to continue the process. When the diagnosis area is established (Yes in step 3101), the process proceeds to step 3102. When the diagnosis area is not established (No in step 3101), the failure mode determination process A ends and proceeds to the next task.

(ii) Step 3102

The wasted time detection unit 106 checks whether the target air-fuel ratio is a lean value and the real air-fuel ratio is a rich value. When these two are established (Yes in step 3102), the process proceeds to step 3103. When these two are not established (No in step 3102), the process proceeds to step 3104.

(iii) Step 3103

The wasted time detection unit 106 sets timer 1 to timer 1 (previous value)+0.004s. Then, the process returns to step 3102.

(iv) Step 3104

The wasted time detection unit 106 checks whether the target air-fuel ratio is a rich value and the real air-fuel ratio is a lean value. When these two are established (Yes in step 3104), the process proceeds to step 3105. When these two are not established (No in step 3104), the process proceeds to step 3106.

(v) Step 3105

The wasted time detection unit 106 sets timer 2 to timer 2 (previous value)+0.004s. Then, the process returns to step 3104.

(vi) Step 3106

The wasted time detection unit 106 checks whether the "target air-fuel ratio is a lean value and a real air-fuel ratio is a rich value" or the "target air-fuel ratio is a rich value and real air-fuel ratio is a lean value". When the condition is established (Yes in step 3106), the process proceeds to step 3107. When the condition is not established (No in step 3106), the process proceeds to step 3108.

(vii) Step 3107

The wasted time detection unit 106 sets timer 3 to timer 3 (previous value)+0.004s. Then, the process returns to step 3106.

(viii) Step 3108

The wasted time detection unit 106 determines whether the inversion frequency N of the real air-fuel ratio sensor signal reaches a predetermined frequency. When N reaches a predetermined frequency (Yes in step 3108), the process proceeds to step 3109. When N does not reach a predetermined frequency (No in step 3108), the process proceeds to step 3102.

(ix) Step 3109

The wasted time delay abnormality detection unit 108 checks whether the timer 1 is greater than the NG threshold value 2, the timer 2 is greater than the NG threshold value 3, or the timer 3 is greater than the NG threshold value 4.

Figure 32:
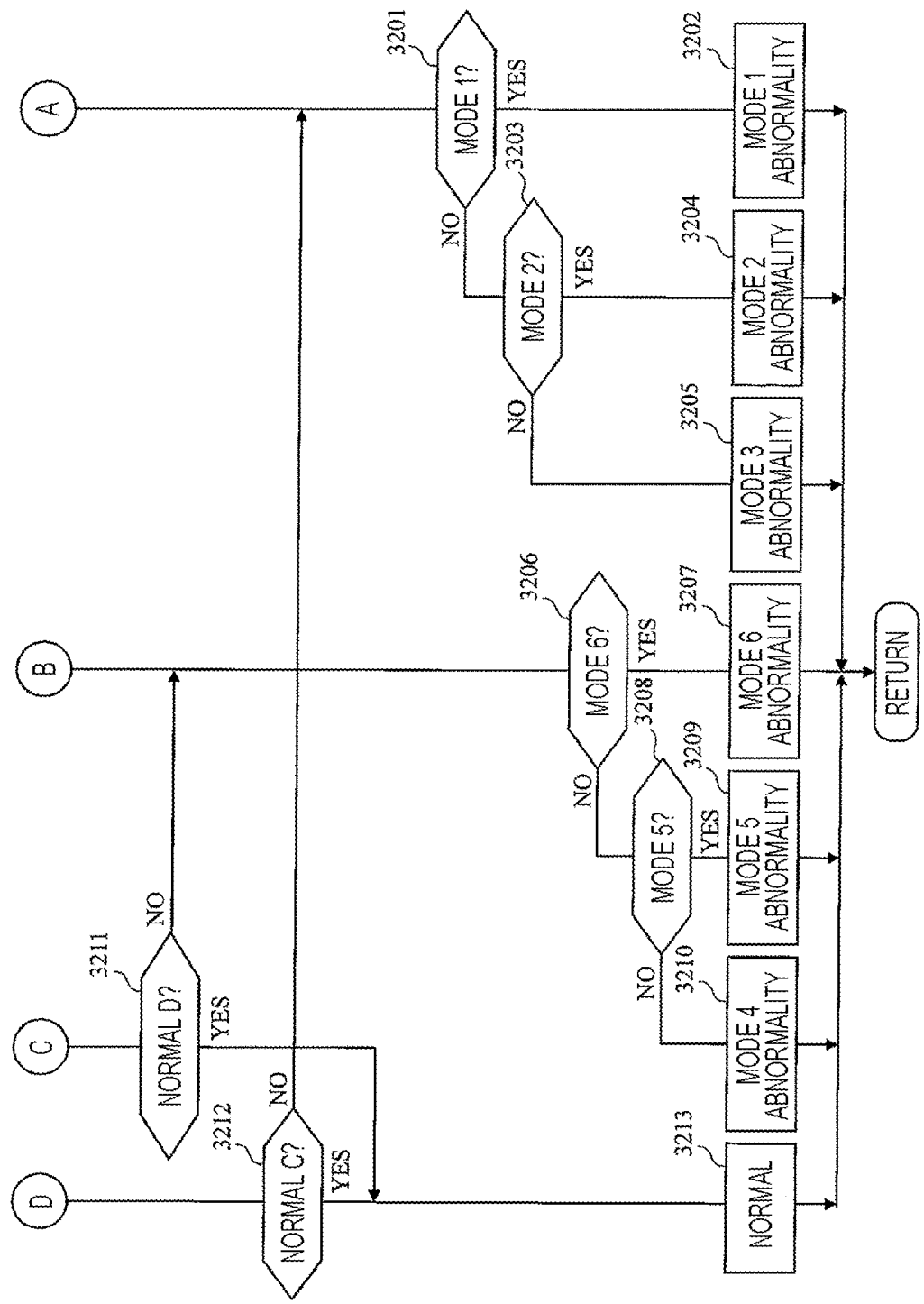
FIG. 32 is a flowchart for describing a process of determining final deterioration abnormality (final deterioration abnormality determination process) from mode determination A in FIG. 28, a response time constant diagnosis result in FIG. 29, mode determination B in FIG. 30, and a wasted time diagnosis result in FIG. 31.

If any of these conditions is established (Yes in step 3109), the process proceeds to B (see FIG. 32). If none of these conditions are established (No in step 3109), the process proceeds to step 3110.

(x) Step 3110

The response deterioration abnormality determination unit B112 determines that the state of the air-fuel ratio sensor 205 is normal D. In this case, the process further proceeds to D (see FIG. 32). The normal D means that the wasted time diagnosis result is normal. In this case, since it is unclear whether the response time constant diagnosis is normal, the process proceeds to D (see FIG. 32) and a further determination is made.

Note that actually, since the target air-fuel ratio swings in a triangular wave, the wasted time delay as illustrated on the right of FIG. 4 occurs. Therefore, it is difficult and complicated to detect the wasted time by a simple method as illustrated in FIG. 15.

<Final Deterioration Abnormality Determination Process>

FIG. 32 is a flowchart for describing a process (final deterioration abnormality determination process) of performing the final deterioration abnormality determination from the mode determination A of FIG. 28, the response time constant diagnosis result of FIG. 29, the mode determination B of FIG. 30, and the wasted time diagnosis result of FIG. 31. In FIG. 32, A is the case where the response time constant diagnosis is abnormal, and is a starting point of the process of checking which of the failure modes 1 to 3 is applicable. B is the case where the wasted time diagnosis is abnormal, and is a starting point of the processing process for checking which of the failure modes 4 to 6 is applicable. C is a starting point of the processing process when the response time constant diagnosis is normal. D is a starting point of the processing process when the wasted time diagnosis is normal.

In the following explanation, the final deterioration abnormality determination unit 113, the response deterioration abnormality determination unit A111, or the response deterioration abnormality determination unit B112 is an operating subject, but the final deterioration abnormality determination unit 113, the response deterioration abnormality determination unit A111, or the response deterioration abnormality determination unit B112 is configured in the MPU2071, so the MPU 2071 may be read as an operating subject.

(i) Step 3201

The final deterioration abnormality determination unit 113 checks the failure mode 1. When it is determined to be the failure mode 1 (Yes in step 3201), the process proceeds to step 3202. When it is not determined to be the failure mode 1 (No in step 3201), the process proceeds to step 3203.

(ii) Step 3202

The final deterioration abnormality determination unit 113 determines that the failure mode 1 is abnormal.}

(iii) Step 3203

The final deterioration abnormality determination unit 113 checks the failure mode 2. When it is determined to be the failure mode 2 (Yes in step 3203), the process proceeds to step 3204. When it is not determined to be the failure mode 2 (No in step 3203), the process proceeds to step 3205.

(iv) Step 3204

The final deterioration abnormality determination unit 113 determines that the failure mode 2 is abnormal.

(v) Step 3205

The final deterioration abnormality determination unit 113 determines that the failure mode 3 is abnormal.

(vi) Step 3206

The final deterioration abnormality determination unit 113 checks the failure mode 6. When it is determined to be the failure mode 6 (Yes in step 3206), the process proceeds to step 3207. When it is not determined to be the failure mode 6 (No in step 3206), the process proceeds to step 3208.

(vii) Step 3207

The final deterioration abnormality determination unit 113 determines that the failure mode 6 is abnormal.

(viii) Step 3208

The final deterioration abnormality determination unit 113 checks the failure mode 5. When it is determined to be the failure mode 5 (Yes in step 3208), the process proceeds to step 3209. When it is not determined to be the failure mode 5 (No in step 3208), the process proceeds to step 3210.

(ix) Step 3209

The final deterioration abnormality determination unit 113 determines that the failure mode 5 is abnormal.

(x) Step 3210

The final deterioration abnormality determination unit 113 determines that the failure mode 4 is abnormal. Note that since the wasted time of the failure mode 6 is larger than that of other failure modes 4 and 5, in the wasted time diagnosis, top priority is assigned to the determination of the failure mode 6.

(xi) Step 3211

The response deterioration abnormality determination unit A111 checks the normal D. If the normal D (Yes in step 3211), the process proceeds to step 3213. Note that the normal D is the case where the wasted time diagnosis is normal, and if both the C and D are not established, the normal determination is not made. If not the normal D (No in step 3211), there is a possibility of the wasted time diagnosis abnormality, so the process proceeds to B.

(xii) Step 3212

The response deterioration abnormality determination unit B112 checks the normal C. If the normal C (Yes in step 3212), the process proceeds to step 3213. Note that the normal C is the case where the response time constant diagnosis is normal, and if both the C and D are not established as described above, the normal determination is not made. If not the normal C (No in step 3212), there is a possibility of the response time constant diagnosis abnormality, so the process proceeds to A.

(xiii) Step 3213

The final deterioration abnormality determination unit 113 determines that the air-fuel ratio sensor 205 is normal. That is, when step 3211 is established and step 3212 is established, it is determined to be normal.

When the response time constant diagnosis is normal and the wasted time diagnosis is normal, the air-fuel ratio sensor 205 can be determined to be normal, so the process as illustrated in FIG. 32 is made.

SUMMARY (1) As described above, according to the present embodiment, six failure modes of the air-fuel ratio sensor response deterioration diagnosis can be determined.

The present embodiment relates to a diagnostic device that accurately diagnoses six failure modes in the response deterioration diagnosis of the air-fuel ratio sensor attached to the internal combustion engine and is an indispensable technology for complying with tightening of vehicle self-diagnosis regulations.

(2) In the present embodiment, when the target air-fuel ratio swings rich⇔lean, the real air-fuel ratio sensor signal is differentiated, squared, and then integrated, and the response time constant is detected from the reciprocal thereof. When the response time constant includes the lean→rich response time constant delay, the rich→lean response time constant delay, and the lean⇔rich response time constant delay, and when each of the lean→rich response time constant delay, the rich→lean response time constant delay, and the lean⇔rich response time constant delay exceeds the predetermined threshold value, it is determined to be abnormal. In addition, similarly, when the target air-fuel ratio swings rich⇔lean, in the target air-fuel ratio and the real air-fuel ratio of the air-fuel ratio sensor signal, the time difference from when the target air-fuel ratio rises to lean to the time when the real air-fuel ratio sensor signal rises to lean is set to the wasted time 1, and the time difference from the time when the target air-fuel ratio falls to rich to the time when the real air-fuel ratio sensor signal falls to rich is set to the wasted time 1. When there are the wasted time 1, the wasted time 2, and the wasted time 1+the wasted time 2, and when each of the wasted time 1, the wasted time 2, and the wasted time 1+the wasted time 2 exceeds the predetermined threshold value, it is determined to be abnormal.

(3) The main disclosure items in the present embodiment are summarized below.

(i) Disclosure Item 1

A control device (FIG. 1: control device 1) includes a microprocessor (MPU2071) for detecting a response delay of an air-fuel ratio sensor attached to an internal combustion engine, in which the microprocessor includes a target air-fuel ratio change unit (target air-fuel ratio change unit 102) configured to change a target air-fuel ratio between lean and rich, and a response delay detection unit (response time constant detection unit 105) configured to detect a response delay of the air-fuel ratio sensor occurring in a real air-fuel ratio sensor signal output from the air-fuel ratio sensor when the target air-fuel ratio change unit changes the target air-fuel ratio between the lean and the rich.

With this configuration, it becomes possible to detect the delay of the time constant of the air-fuel ratio sensor and classify the deterioration based on the detection result.

(ii) Disclosure Item 2

According to disclosure item 1, the macroprocessor further includes a response delay abnormality detection unit (FIG. 1: response time constant delay abnormality detection unit 107) configured to detect abnormality in a response delay by determining whether the response delay detected by the response delay detection unit is greater than a predetermined response delay NG threshold value.

In this way, since the abnormality in the time constant delay of the air-fuel ratio sensor is detected, the abnormality in the response characteristic of the air-fuel ratio sensor can be appropriately classified.

(iii) Disclosure Item 3

According to disclosure item 2, the microprocessor further includes a first failure mode determination unit (FIG. 1: failure mode determination unit A109) configured to calculate a change in the real air-fuel ratio sensor signal and determine a type of the response delay based on a value of a ratio of the frequency of a negative change and the frequency of a positive change for a predetermined period.

With this configuration, it becomes possible to accurately specify the type of the response delay.

(iv) Disclosure 4

According to disclosure item 3, the first failure mode determination unit calculates the frequency of the negative change by incrementing a negative counter when a differential value of the real air-fuel ratio sensor signal is less than zero, calculates the frequency of the positive change by incrementing a positive counter when the differential value of the air-fuel ratio sensor signal is equal to or greater than zero, and determines a failure mode 1, a failure mode 2, and a failure mode 3 from a ratio of a value of the negative counter and a value of the positive counter for the predetermined period.

With this configuration, it becomes possible to accurately detect the failure mode in the response time constant of the air-fuel ratio sensor.

(v) Disclosure Item 5

According to disclosure item 4, the failure mode 1 is a mode in which a first response time constant delay occurs in the real air-fuel ratio sensor signal when the target air-fuel ratio change unit changes the target air-fuel ratio from lean to rich, the failure mode 2 is a mode in which a second response time constant delay occurs in the real air-fuel ratio sensor signal when the target air-fuel ratio change unit changes the target air-fuel ratio from the rich to the lean, and the failure mode 3 is a mode in which a third response time constant delay occurs in the real air-fuel ratio sensor signal in both when the target air-fuel ratio change unit changes the target air-fuel ratio from the lean to the rich and when the target air-fuel ratio change unit changes the target air-fuel ratio from the rich to the lean.

With this configuration, it becomes possible to accurately detect the failure mode in the response time constant of the air-fuel ratio sensor.

(vi) Disclosure Item 6

According to disclosure item 3, the microprocessor further includes a first response deterioration abnormality determination unit (response deterioration abnormality determination unit A111) configured to determine a type of the abnormality in the response delay based on information on the type of the response delay determined by the first failure mode determination unit when there is the abnormality in the response delay.

With this configuration, when there is the abnormality in the response delay, the type is specified, so the abnormality in the response delay can be efficiently classified.

(vii) Disclosure Item 7

According to disclosure item 1, the microprocessor further includes a wasted time detection unit (wasted time detection unit 106) configured to detect wasted time from a time lag between the target air-fuel ratio and the air-fuel ratio sensor signal, and a wasted time abnormality detection unit (wasted time delay abnormality detection unit 108) configured to detect abnormality in the wasted time by determining whether the wasted time detected by the wasted time detection unit is longer than a predetermined wasted time NG threshold value.

With this configuration, it is possible to detect the abnormality in the wasted time, apart from the response time constant, and it is possible to accurately classify the abnormality in the air-fuel ratio sensor.

(viii) Disclosure Item 8

According to disclosure item 7, the microprocessor further includes a second failure mode determination unit (failure mode determination unit B110) configured to calculate the change in the real air-fuel ratio sensor signal output from the air-fuel ratio sensor, and determine the type of the wasted time based on a relationship between a frequency of zero change, a frequency of negative change, and a frequency of positive change, respectively, for a predetermined period.

With this configuration, a specific method for determining the type of the wasted time is provided.

(ix) Disclosure Item 9

According to disclosure item 8, the second failure mode determination unit calculates the frequency of the zero change by incrementing a zero counter when the differential value of the real air-fuel ratio sensor signal is zero, calculates the frequency of the positive change by incrementing a positive counter when the differential value of the real air-fuel ratio sensor signal is positive, calculates the frequency of the negative change by incrementing a negative counter when the differential value of the real air-fuel ratio sensor signal is negative, and determines a failure mode 4, a failure mode 5, and a failure mode 6 from a difference relationship between a value of the zero counter, a value of the positive counter, and a value of the negative counter.

With this configuration, a more specific method for determining the type of the wasted time is provided.

(x) Disclosure Item 10

According to claim 9, the failure mode 4 is a failure mode in which there is a first wasted time which is a time difference from time when the target air-fuel ratio rises in a lean direction to time when the real air-fuel ratio sensor signal rises in the lean direction, in the real air-fuel ratio sensor signal when the target air-fuel ratio change unit changes the target air-fuel ratio from the lean to the rich, the failure mode 5 is a failure mode in which there is a second wasted time which is a time difference from time when the target air-fuel ratio rises in a rich direction to time when the real air-fuel ratio sensor signal rises in the rich direction, in the real air-fuel ratio sensor signal when the target air-fuel ratio change unit changes the target air-fuel ratio from the rich to the lean, and the failure mode 6 is a failure mode in which there are both the first wasted time and the second wasted time, in the real air-fuel ratio sensor signal when the target air-fuel ratio change unit changes the target air-fuel ratio between the lean and the rich.

With this configuration, it becomes possible to clearly classify the wasted time.

(xi) Disclosure Item 11

According to disclosure item 8, the microprocessor further includes a second deterioration abnormality determination unit (response deterioration abnormality determination unit B112) configured to determine the type of the abnormality in the wasted time based on the information on the type of the wasted time determined by the second failure mode determination unit when there is the abnormality in the wasted time.

With this configuration, the wasted time in the air-fuel ratio sensor response characteristic can be accurately classified as the deterioration mode.

(xii) Disclosure Item 12

A control device includes a microprocessor (MPU2071) configured to detect a response delay of an air-fuel ratio sensor attached to an internal combustion engine, in which the microprocessor includes a target air-fuel ratio change unit (target air-fuel ratio change unit 102) configured to change a target air-fuel ratio between lean and rich, a response delay detection unit (response time constant delay abnormality detection unit 107) configured to detect a first response delay of the air-fuel ratio sensor that occurs when the target air-fuel ratio change unit changes the target air-fuel ratio from lean to rich, a second response delay of the air-fuel ratio sensor that occurs when the target air-fuel ratio change unit changes the target air-fuel ratio from the rich to the lean, and a third response delay of the air-fuel ratio sensor that occurs both when the target air-fuel ratio change unit changes the target air-fuel ratio from the lean to the rich and when the target air-fuel ratio change unit changes the target air-fuel ratio from the rich to the lean based on a real air-fuel ratio sensor signal output from the air-fuel ratio sensor and a set threshold value, a slope detection unit (failure mode determination unit 109) configured to detect a slope of the air-fuel ratio sensor signal, and a determination unit (final deterioration abnormality determination unit 113) configured to determine whether the response delay detected by the response delay detection unit is the first response delay, the second response delay, or the third response delay based on a ratio of a period for which the slope detected by the slope detection unit is positive and a period for which the slope is negative.

With this configuration, it becomes possible to accurately detect the failure mode in the response time constant of the air-fuel ratio sensor.

(xiii) Disclosure Item 13

A control device includes a microprocessor (MPU2071) configured to detect a response delay of an air-fuel ratio sensor attached to an internal combustion engine, in which the microprocessor includes a target air-fuel ratio change unit (target air-fuel ratio change unit 102) configured to change a target air-fuel ratio between lean and rich, and a response delay detection unit (response time constant detection unit 105) configured to detect a response delay of the air-fuel ratio sensor occurring in a real air-fuel ratio sensor signal output from the air-fuel ratio sensor when the target air-fuel ratio change unit changes the target air-fuel ratio between the lean and the rich, a response delay abnormality detection unit (response time constant delay abnormality detection unit 107) configured to detect abnormality in the response delay by determining whether the response delay detected by the response delay detection unit is greater than a predetermined response delay NG threshold value, a first failure mode determination unit (failure mode determination unit A109) configured to calculate the change in the real air-fuel ratio sensor signal and determine the type of the response delay based on a value of a ratio of a frequency of negative change and a frequency of positive change for a predetermined period, a first response deterioration abnormality determination unit (response deterioration abnormality determination unit A111) configured to determine a type of the abnormality in the response delay based on information on the type of the response delay determined by the first failure mode determination unit when there is the abnormality in the response delay, a wasted time detection unit (wasted time detection unit 106) configured to detect wasted time from a time lag between the target air-fuel ratio and the air-fuel ratio sensor signal, a wasted time abnormality detection unit (wasted time delay abnormality detection unit 108) configured to detect abnormality in wasted time by determining whether the wasted time detected by the wasted time detection unit is longer than a predetermined wasted time NG threshold value, a second failure mode determination unit (failure mode determination unit B110) configured to calculate the change in the real air-fuel ratio sensor signal output from the air-fuel ratio sensor, and determine the type of the wasted time based on a relationship between a frequency of zero change, the frequency of the negative change, and the frequency of the positive change, respectively, for a predetermined period, a second response deterioration abnormality determination unit (response deterioration abnormality determination unit B112) configured to determine the type of the abnormality in the wasted time based on the information on the type of the wasted time determined by the second failure mode determination unit when there is the abnormality in the wasted time, and a final deterioration abnormality determination unit (final deterioration abnormality determination unit 113) configured to determine the final abnormality in the air-fuel ratio sensor based on the determination results of the first response deterioration abnormality determination unit and the second response deterioration abnormality determination unit.

With this configuration, it becomes possible to accurately detect and classify the failure mode in the response time constant and the wasted time of the air-fuel ratio sensor.

(xiv) Disclosure Item 14

According to disclosure item 13, the first failure mode determination unit calculates the frequency of the negative change by incrementing a negative counter when a differential value of the real air-fuel ratio sensor signal is less than zero, calculates the frequency of the positive change by incrementing a positive counter when the differential value of the air-fuel ratio sensor signal is equal to or greater than zero, and determines a failure mode 1, a failure mode 2, and a failure mode 3 from a ratio of a value of the negative counter and a value of the positive counter for the predetermined period, the failure mode 1 is a mode in which a first response time constant delay occurs in the real air-fuel ratio sensor signal when the target air-fuel ratio change unit changes the target air-fuel ratio from the lean to the rich, the failure mode 2 is a mode in which a second response time constant delay occurs in the real air-fuel ratio sensor signal when the target air-fuel ratio change unit changes the target air-fuel ratio from the rich to the lean, and the failure mode 3 is a mode in which a third response time constant delay occurs in the real air-fuel ratio sensor signal in both when the target air-fuel ratio change unit changes the target air-fuel ratio from the lean to the rich and when the target air-fuel ratio change unit changes the target air-fuel ratio from the rich to the lean.

With this configuration, it becomes possible to efficiently and reliably classify abnormalities into a specific failure mode.

(xv) Disclosure Item 15

According to disclosure item 13, the second failure mode determination unit calculates the frequency of the zero change by incrementing a zero counter when the differential value of the real air-fuel ratio sensor signal is zero, calculates the frequency of the positive change by incrementing a positive counter when the differential value of the real air-fuel ratio sensor signal is positive, calculates the frequency of the negative change by incrementing a negative counter when the differential value of the real air-fuel ratio sensor signal is negative, and determines a failure mode 4, a failure mode 5, and a failure mode 6 from a difference relationship between a value of the zero counter, a value of the positive counter, and a value of the negative counter, the failure mode 4 is a failure mode in which there is a first wasted time which is a time difference from time when the target air-fuel ratio rises in a lean direction to time when the real air-fuel ratio sensor signal rises in the lean direction, in the real air-fuel ratio sensor signal when the target air-fuel ratio change unit changes the target air-fuel ratio from the lean to the rich, the failure mode 5 is a failure mode in which there is a second wasted time which is a time difference from time when the target air-fuel ratio rises in a rich direction to time when the real air-fuel ratio sensor signal rises in the rich direction, in the real air-fuel ratio sensor signal when the target air-fuel ratio change unit changes the target air-fuel ratio from the rich to the lean, and the failure mode 6 is a failure mode in which there are both the first wasted time and the second wasted time, in the real air-fuel ratio sensor signal when the target air-fuel ratio change unit changes the target air-fuel ratio between the lean and the rich.

With this configuration, it becomes possible to clearly classify the wasted time.

(4) The embodiment can also be realized by a software program code. In this case, a storage medium in which the program code is recorded is provided to the system or device, and the computer (or CPU or MPU) of the system or device reads out the program code stored in the storage medium. In this case, the program code itself read from the storage medium realizes the function of the above-described embodiment, and the program code itself and the storage medium storing the program code itself constitute the present disclosure. Examples of the storage medium for supplying such program code include a flexible disk, a CD-ROM, a DVD-ROM, a hard disk, an optical disk, a magneto-optical disk, a CD-R, a magnetic tape, a non-volatile memory card, a ROM, and the like.

In addition, based on the instructions of the program code, an operating system (OS) and the like running on the computer performs a part or all of the actual processes, and the processes may realize the functions of the above-described embodiment. Further, after the program code read from the storage medium is written in the memory on the computer, the CPU of the computer or the like performs a part or all of the actual processes based on the instruction of the program code, and the processes may realize the functions of the above-described embodiment.

Further, by distributing the program code of the software that realizes the functions of the embodiment via the network, the program code is stored in a storage means such as a hard disk or a memory of a system or a device or a storage medium such as a CD-RW or a CD-R, and the computer (or CPU or MPU) of the system or device may read and execute the program code stored in the storage means or the storage medium at the time of use.

Finally, it should be understood that the processes and techniques described here are not inherently relevant to any particular device and can be implemented in any suitable combination of components. In addition, various types of devices for general purpose can be used according to the teachings described herein. It is useful to build a dedicated device to carry out the steps of the method described here. In addition, various inventions can be formed by appropriately combining the plurality of components disclosed in the embodiments. For example, some components may be removed from all the components illustrated in the embodiments. In addition, components in different embodiments may be combined as appropriate. The present disclosure has been described in connection with specific examples, but these examples are not for restrictions in every respect, but for explanations. Those skilled in the field will find that there are numerous combinations of hardware, software, and firmware suitable for performing the present disclosure. For example, the software described can be implemented in a wide range of programming or scripting languages such as assembler, C/C++, perl, Shell, PHP, and Java (registered trademark).

Further, in the above-described embodiment, control lines or information lines are shown as necessary for explanation, and all the control lines or information lines are not necessarily shown on products. All components may be interconnected.

REFERENCE SIGNS LIST 101 diagnosis area determination unit
102 target air-fuel ratio change unit
103 real air-fuel ratio detection unit
104 target air-fuel ratio detection unit
105 response time constant detection unit
106 wasted time detection unit
107 response time constant delay abnormality detection unit
108 wasted time delay abnormality detection unit
109 failure mode determination unit A
110 failure mode determination unit B
111 response deterioration abnormality determination unit A
112 response deterioration abnormality determination unit B
113 final deterioration abnormality determination unit
200 air cleaner
201 ignition device
202 fuel injection device
203 number of revolution detection device
204 flow rate detection device
205 air-fuel ratio sensor (oxygen sensor before catalyst)
206 three-way catalyst
207 internal combustion engine control device
208 plate or ring gear
209 fuel tank
210 fuel pump
211 pressure regulator
212 fuel pipe
213 throttle valve
214 cylinder
215 oxygen sensor after catalyst

The invention claimed is:

1. A control device, comprising a microprocessor configured to detect a response delay of an air-fuel ratio sensor attached to an internal combustion engine,
wherein the microprocessor includes:
a target air-fuel ratio change unit configured to change a target air-fuel ratio between lean and rich,
a response delay detection unit configured to detect a response delay of the air-fuel ratio sensor occurring in a real air-fuel ratio sensor signal output from the air-fuel ratio sensor when the target air-fuel ratio change unit changes the target air-fuel ratio between the lean and the rich, a response delay abnormality detection unit configured to detect abnormality in a response delay by determining whether the response delay detected by the response delay detection unit is greater than a predetermined response delay NG threshold value, and
a first failure mode determination unit configured to calculate a change in the real air-fuel ratio sensor signal and determine a type of the response delay based on a value of a ratio of a frequency of negative change and a frequency of positive change for a predetermined period.

2. The control device according to claim 1, wherein the first failure mode determination unit calculates the frequency of the negative change by incrementing a negative counter when a differential value of the real air-fuel ratio sensor signal is less than zero, calculates the frequency of the positive change by incrementing a positive counter when the differential value of the real air-fuel ratio sensor signal is equal to or greater than zero, and determines a failure mode 1, a failure mode 2, and a failure mode 3 from a ratio of a value of the negative counter and a value of the positive counter for the predetermined period.

3. The control device according to claim 2, wherein
the failure mode 1 is a mode in which a first response time constant delay occurs in the real air-fuel ratio sensor signal when the target air-fuel ratio change unit changes the target air-fuel ratio from lean to rich,
the failure mode 2 is a mode in which a second response time constant delay occurs in the real air-fuel ratio sensor signal when the target air-fuel ratio change unit changes the target air-fuel ratio from the rich to the lean, and
the failure mode 3 is a mode in which a third response time constant delay occurs in the real air-fuel ratio sensor signal both when the target air-fuel ratio change unit changes the target air-fuel ratio from the lean to the rich and when the target air-fuel ratio change unit changes the target air-fuel ratio from the rich to the lean.

4. The control device according to claim 1, wherein the microprocessor further includes a first response deterioration abnormality determination unit configured to determine a type of the abnormality in the response delay based on information on the type of the response delay determined by the first failure mode determination unit when there is the abnormality in the response delay.

5. The control device according to claim 1, wherein the microprocessor further includes a wasted time detection unit configured to detect wasted time from a time lag between the target air-fuel ratio and the real air-fuel ratio sensor signal, and a wasted time abnormality detection unit configured to detect abnormality in the wasted time by determining whether the wasted time detected by the wasted time detection unit is longer than a predetermined wasted time NG threshold value.

6. The control device according to claim 5, wherein the microprocessor further includes a second failure mode determination unit configured to calculate the change in the real air-fuel ratio sensor signal output from the air-fuel ratio sensor, and determine the type of the wasted time based on a relationship between a frequency of zero change, a frequency of negative change, and a frequency of positive change, respectively, for a predetermined period.

7. The control device according to claim 6, wherein the second failure mode determination unit calculates the frequency of the zero change by incrementing a zero counter when the differential value of the real air-fuel ratio sensor signal is zero, calculates the frequency of the positive change by incrementing a positive counter when the differential value of the real air-fuel ratio sensor signal is positive, calculates the frequency of the negative change by incrementing a negative counter when the differential value of the real air-fuel ratio sensor signal is negative, and determines a failure mode 4, a failure mode 5, and a failure mode 6 from a difference relationship between a value of the zero counter, a value of the positive counter, and a value of the negative counter.

8. The control device according to claim 7, wherein
the failure mode 4 is a failure mode in which there is a first wasted time which is a time difference from time when the target air-fuel ratio rises in a lean direction to time when the real air-fuel ratio sensor signal rises in the lean direction, in the real air-fuel ratio sensor signal when the target air-fuel ratio change unit changes the target air-fuel ratio from the lean to the rich,
the failure mode 5 is a failure mode in which there is a second wasted time which is a time difference from time when the target air-fuel ratio rises in a rich direction to time when the real air-fuel ratio sensor signal rises in the rich direction, in the real air-fuel ratio sensor signal when the target air-fuel ratio change unit changes the target air-fuel ratio from the rich to the lean, and
the failure mode 6 is a failure mode in which there are both the first wasted time and the second wasted time, in the real air-fuel ratio sensor signal when the target air-fuel ratio change unit changes the target air-fuel ratio between the lean and the rich.

9. The control device according to claim 6, wherein the microprocessor further includes a second response deterioration abnormality determination unit configured to determine the type of the abnormality in the wasted time based on the information on the type of the wasted time determined by the second failure mode determination unit when there is the abnormality in the wasted time.

10. A control device, comprising a microprocessor configured to detect a response delay of an air-fuel ratio sensor attached to an internal combustion engine,
wherein the microprocessor includes:
a target air-fuel ratio change unit configured to change a target air-fuel ratio between lean and rich,
a response delay detection unit configured to detect a first response delay of the air-fuel ratio sensor that occurs when the target air-fuel ratio change unit changes the target air-fuel ratio from lean to rich, a second response delay of the air-fuel ratio sensor that occurs when the target air-fuel ratio change unit changes the target air-fuel ratio from the rich to the lean, and a third response delay of the air-fuel ratio sensor that occurs both when the target air-fuel ratio change unit changes the target air-fuel ratio from the lean to the rich and when the target air-fuel ratio change unit changes the target air-fuel ratio from the rich to the lean based on a real air-fuel ratio sensor signal output from the air-fuel ratio sensor and a set threshold value,
a slope detection unit configured to detect a slope of the real air-fuel ratio sensor signal, and
a determination unit configured to determine whether the response delay detected by the response delay detection unit is the first response delay, the second response delay, or the third response delay based on a ratio of a period for which the slope detected by the slope detection unit is positive and a period for which the slope is negative.

11. A control device, comprising a microprocessor configured to detect a response delay of an air-fuel ratio sensor attached to an internal combustion engine,
wherein the microprocessor includes:
a target air-fuel ratio change unit configured to change a target air-fuel ratio between lean and rich,
a response delay detection unit configured to detect a response delay of the air-fuel ratio sensor occurring in a real air-fuel ratio sensor signal output from the air-fuel ratio sensor when the target air-fuel ratio change unit changes the target air-fuel ratio between the lean and the rich,
a response delay abnormality detection unit configured to detect abnormality in the response delay by determining whether the response delay detected by the response delay detection unit is greater than a predetermined response delay NG threshold value,
a first failure mode determination unit configured to calculate the change in the real air-fuel ratio sensor signal and determine the type of the response delay based on a value of a ratio of a frequency of negative change and a frequency of positive change for a predetermined period,
a first response deterioration abnormality determination unit configured to determine a type of the abnormality in the response delay based on information on the type of the response delay determined by the first failure mode determination unit when there is the abnormality in the response delay,
a wasted time detection unit configured to detect wasted time from a time lag between the target air-fuel ratio and the real air-fuel ratio sensor signal,
a wasted time abnormality detection unit configured to detect abnormality in wasted time by determining whether the wasted time detected by the wasted time detection unit is longer than a predetermined wasted time NG threshold value,
a second failure mode determination unit configured to calculate the change in the real air-fuel ratio sensor signal output from the air-fuel ratio sensor, and determine the type of the wasted time based on a relationship between a frequency of zero change, the frequency of the negative change, and the frequency of the positive change, respectively, for a predetermined period,
a second response deterioration abnormality determination unit configured to determine the type of the abnormality in the wasted time based on the information on the type of the wasted time determined by the second failure mode determination unit when there is the abnormality in the wasted time, and
a final deterioration abnormality determination unit configured to determine the final abnormality in the air-fuel ratio sensor based on the determination results of the first response deterioration abnormality determination unit and the second response deterioration abnormality determination unit.

12. The control device according to claim 11, wherein the first failure mode determination unit calculates the frequency of the negative change by incrementing a negative counter when a differential value of the real air-fuel ratio sensor signal is less than zero, calculates the frequency of the positive change by incrementing a positive counter when the differential value of the real air-fuel ratio sensor signal is equal to or greater than zero, and determines a failure mode 1, a failure mode 2, and a failure mode 3 from a ratio of a value of the negative counter and a value of the positive counter for the predetermined period, and
the failure mode 1 is a mode in which a first response time constant delay occurs in the real air-fuel ratio sensor signal when the target air-fuel ratio change unit changes the target air-fuel ratio from the lean to the rich, the failure mode 2 is a mode in which a second response time constant delay occurs in the real air-fuel ratio sensor signal when the target air-fuel ratio change unit changes the target air-fuel ratio from the rich to the lean, and the failure mode 3 is a mode in which a third response time constant delay occurs in the real air-fuel ratio sensor signal both when the target air-fuel ratio change unit changes the target air-fuel ratio from the lean to the rich and when the target air-fuel ratio change unit changes the target air-fuel ratio from the rich to the lean.

13. The control device according to claim 11, wherein the second failure mode determination unit calculates the frequency of the zero change by incrementing a zero counter when the differential value of the real air-fuel ratio sensor signal is zero, calculates the frequency of the positive change by incrementing a positive counter when the differential value of the real air-fuel ratio sensor signal is positive, calculates the frequency of the negative change by incrementing a negative counter when the differential value of the real air-fuel ratio sensor signal is negative, and determines a failure mode 4, a failure mode 5, and a failure mode 6 from a difference relationship between a value of the zero counter, a value of the positive counter, and a value of the negative counter,
the failure mode 4 is a failure mode in which there is a first wasted time which is a time difference from time when the target air-fuel ratio rises in a lean direction to time when the real air-fuel ratio sensor signal rises in the lean direction, in the real air-fuel ratio sensor signal when the target air-fuel ratio change unit changes the target air-fuel ratio from the lean to the rich,
the failure mode 5 is a failure mode in which there is a second wasted time which is a time difference from time when the target air-fuel ratio rises in a rich direction to time when the real air-fuel ratio sensor signal rises in the rich direction, in the real air-fuel ratio sensor signal when the target air-fuel ratio change unit changes the target air-fuel ratio from the rich to the lean, and
the failure mode 6 is a failure mode in which there are both the first wasted time and the second wasted time, in the real air-fuel ratio sensor signal when the target air-fuel ratio change unit changes the target air-fuel ratio between the lean and the rich.

* * * * *